Patented Dec. 25, 1951

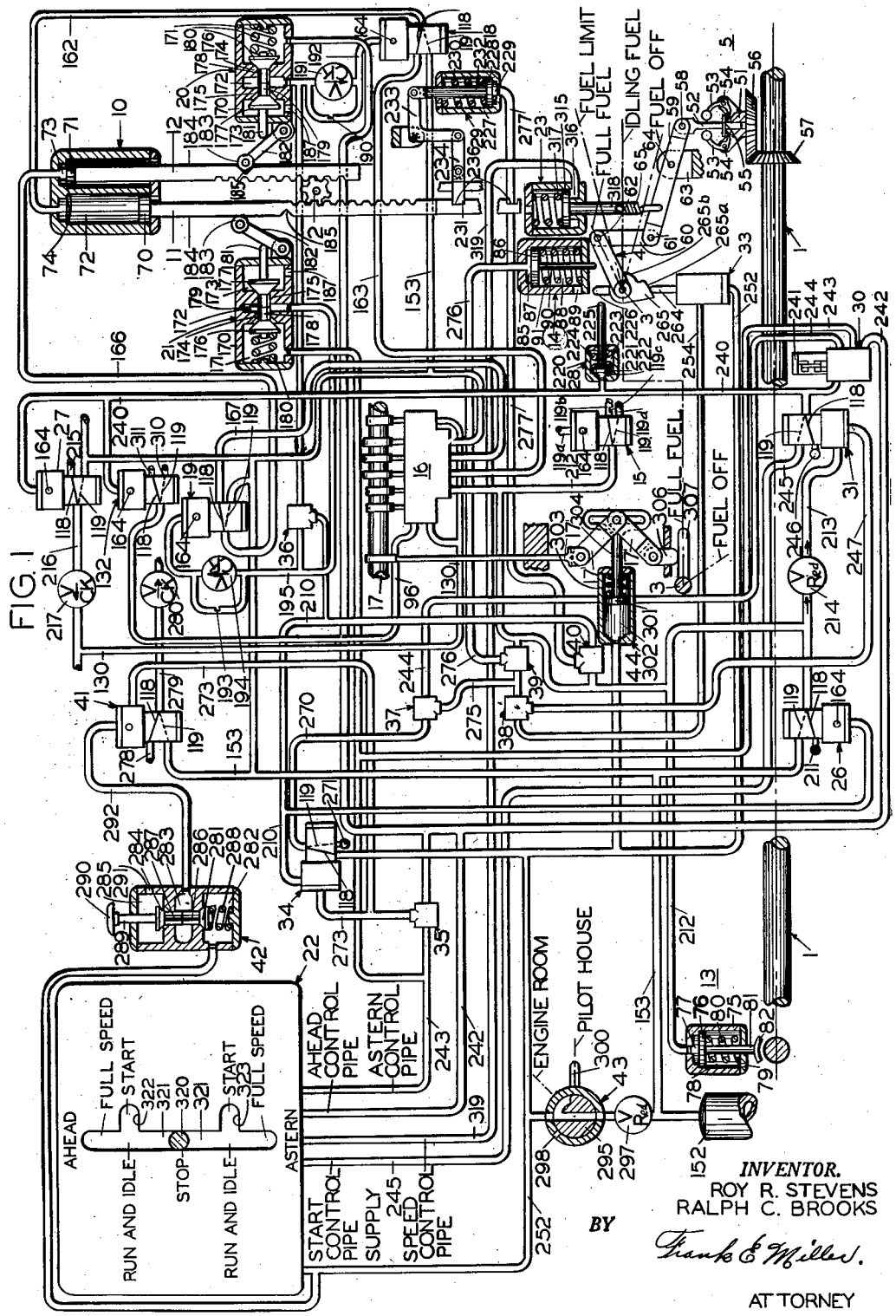

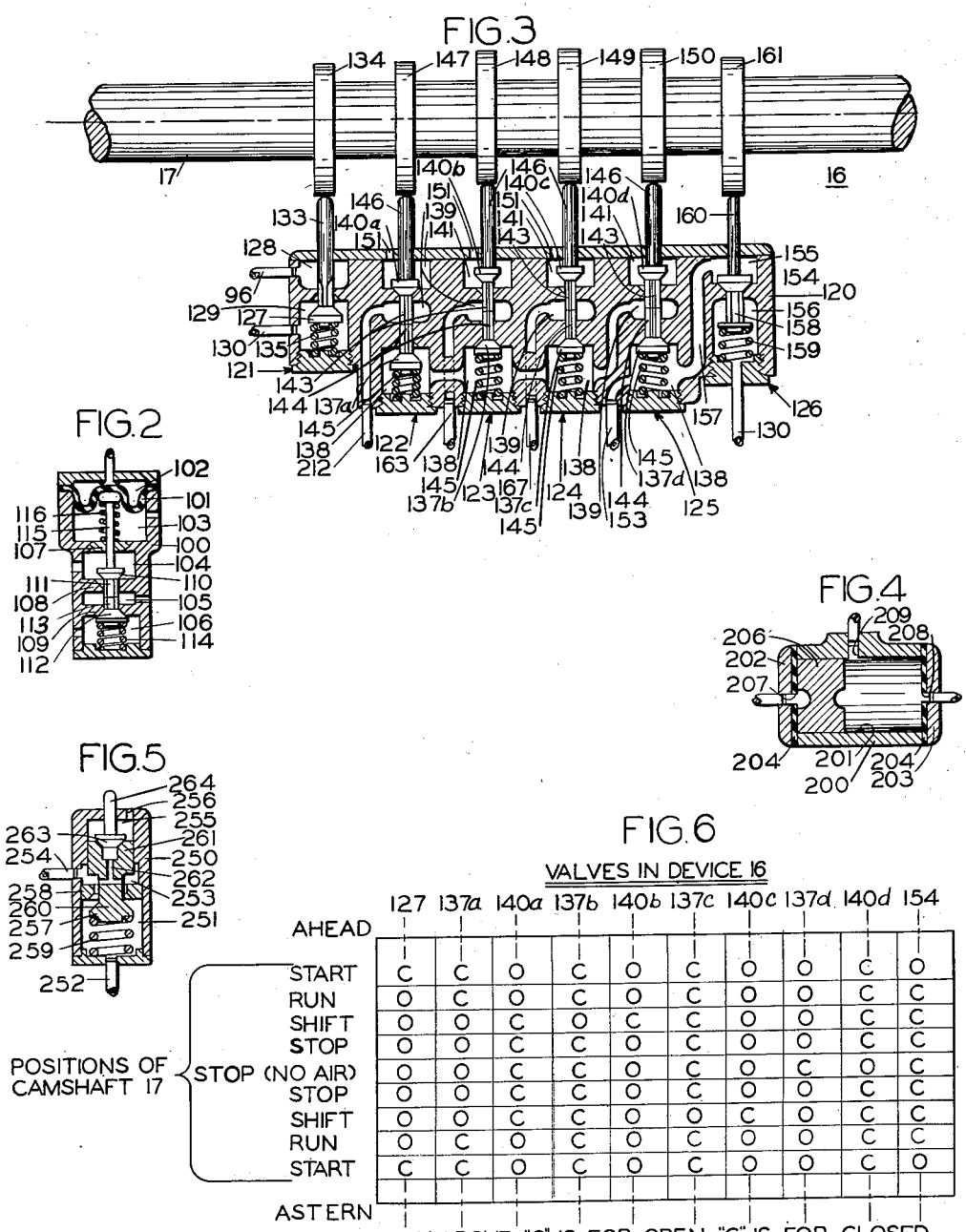

2,580,368

UNITED STATES PATENT OFFICE 2,580,368

FLUID PRESSURE REMOTE-CONTROL APPARATUS

Roy R. Stevens, Forest Hills, and Ralph C. Brooks, Turtle Creek, Pa., assignors to Westinghouse Air Brake Company, a corporation of Pennsylvania Application December 14, 1948, Serial No. 65,266

15 Claims. (Cl. 192—3)

This invention relates to control apparatus and more particularly to the fluid pressure type for controlling a plurality of operations in a desired sequence, such as is required for controlling a reversible diesel engine.

The principal object of the invention is the provision of an improved fluid pressure remote control apparatus adapted to be employed in conjunction with a previously existent controller device at the engine for controlling a plurality of different operations in a desired sequence, such for example, as are incident to effecting the starting, stopping, reversing, etc. of a reversible diesel engine.

According to some of the features of the invention, the improved fluid pressure control apparatus comprises means for effecting automatic cut-off of supply of starting air to engine once the engine begins to run on fuel; means whereby operation of the engine may be terminated as desired either with or without the use of a shaft brake for slow or rapid stopping, respectively, and in either case without the use of starting air, so that such starting air may be conserved; means whereby certain parts of the improved control apparatus may be employed with the previously existent controller device to effect control of engine operation; and means whereby certain parts of the improved control apparatus are conditioned so as not to interfere with control of engine operation by said controller device.

Other objects and advantages will be apparent from the following more detailed description of the invention.

In the accompanying drawings; Fig. 1 is a diagrammatic view, partly in section and partly in outline, of a fluid pressure control apparatus embodying the invention; Fig. 2 is a cross-sectional view of a typical valve device employed in the apparatus shown in Fig. 1; Fig. 3 is a detailed cross-sectional view of the previously existent controller device shown in outline in Fig. 1; Fig. 4 is a cross-sectional view of a typical double check valve device employed in the apparatus shown in Fig. 1; Fig. 5 is a cross-sectional view of another valve device employed in the apparatus shown in Fig. 1; and, Fig. 6 is a schematic diagram to show typical operations of the controller device shown in Fig. 3.

*Description Fig. 1*

The reversible engine (not shown) may comprise the usual crank shaft 1, only portions of which are shown in the drawing, and a cam shaft (not shown) which is adjustable by means of a cam shift gear 2 to either of two positions to condition the engine for operation in one or an ahead direction or to condition the engine for operation in an opposite or astern direction. The crank shaft 1 may be operably connected to the pistons (not shown) of the engine and operatively connected to a propeller or propellers (not shown) of a boat or ship, for example. The cam shaft (not shown) is adapted to be driven in proper phase with the crank shaft 1 in the usual manner for operating conventional engine valve mechanism (not shown) to permit the engine to be started by compressed air for operation in either of opposite directions of rotation, to, for example, drive a ship ahead or astern. The cam shaft may have the usual forward cams (not shown) to provide for operation in the one or ahead direction and may have the usual reverse cams (not shown) to provide for operation in the reverse or astern direction. In the well-known manner, the cam shaft may be shiftable, through actuation of the cam shift gear 2, in one direction to a position for rendering the forward cams effective to operate the engine's valve or timing gear, and in the opposite direction to another position for rendering the reverse cams effective to operate said timing gear.

The reversible internal combustion engine further may comprise a fuel control shaft 3 operatively connected to fuel control valve means (not shown) for regulating the quantity of fuel supplied to the engine cylinders by way of fuel injection nozzles or the like (not shown). The control shaft 3 is in turn operably connected to a fuel control lever 4 which may be disposed outside the engine. The lever 4 is adapted to be moved to a "Fuel off" position, indicated by dot-and-dash line so titled in the drawing, in which position the fuel control valve means (not shown) is so conditioned as to cut off supply of fuel to the engine's cylinders. By counter-clockwise turning movement of lever 4 from its "Fuel off" position, as viewed in the drawing, toward and to a "Full fuel" position, in which position it is shown in the drawing, fuel supply to the engine cylinders may be increased up to a maximum amount corresponding to said "Full fuel" position. An "Idling fuel" position, intermediate "Full fuel" position and "Fuel off" position, may be assumed by lever 4 to effect delivery to the engine's cylinders of an amount of fuel sufficient to sustain operation of the engine at its idling speed.

The control apparatus may comprise a speed governor device 5 which is operable in the usual manner through a driven connection with such as the engine crank shaft 1 to control the amount of fuel supplied to the engine, thereby its speed, through positioning of the fuel control lever 4 in accord with the speed setting of the governor device.

To actuate the cam shift gear 2 and thereby effect conditioning of the engine for operation in its one direction or the other, the control apparatus is provided with the usual cam shift cylinder device 10 mounted on or adjacent to the engine and operatively connected to the cam shift gear 2 through racks 11 and 12 adapted to mesh with said gear.

A fluid pressure operable brake 13 is provided the control apparatus for applying a braking force to oppose rotation of the crank shaft for decelerating the engine.

A fluid pressure fuel cut-off cylinder device 14 is provided for effecting cut off of fuel to the engine during certain control operations concerned with operating same.

Heretofore, control of operation of the engine has been effected substantially by means of a manual controller device 16 which may be mounted on or adjacent to the engine. The controller device 16 comprised a control cam shaft 17 which is adapted to be turned to a plurality of positions by means such as a hand wheel (not shown) to actuate a plurality of valves for controlling operation of the cam shift cylinder device 10, the fuel cut-off cylinder device 14, the brake 13, and supply of starting air to the engine, as will be described in detail hereinafter. Cam shaft 17 was also arranged, in some such manner as is shown schematically in the drawing, to actuate a stop rod linkage 17' to hold the fuel control lever 4 in its "Fuel off" position in a stopping operation of the engine, as will be described subsequently. In conjunction with the controller device 16 an engine oil pressure interlock device 15 was employed to effect automatic release of the brake 13 and fuel cut-off cylinder device 14 during certain control operations which will be described in detail hereinafter.

According to the invention, improved fluid pressure remote control apparatus is provided for controlling operation of the engine through an operator's control device located at a station remote from the engine, such as the pilot house on a ship, and such control apparatus is adapted and arranged in such a manner that operation of the engine may be controlled either by operation of the operator's control device in the pilot house or by operation of the controller device 16 at the engine, as will be described in detail hereinafter. This fluid pressure control apparatus may comprise ahead and astern relay valve devices 18 and 19, respectively, for controlling supply of fluid under pressure to the cam shift cylinder device 10 to operate same; an operator's control device 22, which may be located at a station remote from the engine, such as in the pilot house of a ship, for among other things controlling operation of the ahead and astern relay valve devices 18 and 19; ahead and astern cam shift interlock devices 20 and 21, respectively, which are operable to interlock operation of the relay valve devices 18 and 19 by the operator's control device 22 according to position of the cam shift cylinder device 10. To control the speed setting of the governor device 5, a speed control cylinder device 23 is provided which in turn is arranged to be controlled by the operator's control device 22. To control supply of fluid under pressure to the fluid pressure operable brake 13, a brake relay valve device 26 is provided, and to control supply of starting air to the engine a start relay valve device 27 is provided. There is provided a fuel limit cylinder device 28 which is operable to a position to limit the maximum position attainable by the fuel control lever 4 during starting, thereby limiting the amount of fuel supplied to the engine at that time, and a cam shift lock and cylinder arrangement 29 is provided which is operable to lock the engine cam shaft in either of its two adjusted positions. As will hereinafter become obvious, operation of all of the devices 23, 26, 27, 28 and 29 are arranged to be under the control of the operator's control device 22, but such operation is arranged to be modified by an arrangement of interlock and double check valve devices such as a directional interlock device 30, sensitive to direction of rotation of the engine, a start interlock device 31, the engine oil pressure interlock device 15, a speed interlock device 33, a stop interlock device 34 and double check valve devices 35, 36, 37, 38, 39 and 40. In addition, a decompression relay valve device 41 is provided which is operable to effect supply of fluid under pressure to decompression valves (not shown) on the engine which respond to such supply to vent the engine cylinders to atmosphere to relieve any pressures which may have been held therein at the time the engine was stopped so that such pressure will not oppose subsequent starting of the engine. The decompression relay valve device 41 is arranged to be controlled by a push button type of valve device 42, which may be located adjacent to the operator's control device 22 in the pilot house. The decompression relay valve device 41 is interlocked with operation of the operator's control device 22 in such a manner, as will be described in detail hereinafter, that the decompression valves on the engine may be operated only when the engine is in effect stopped and may not be operated when starting air is being supplied to the engine or when the engine is running on fuel. Still further, a selector valve device 43 is provided which is operable to a position to cut off supply of fluid under pressure to the remote control portion (control from the pilot house) of the control apparatus to render same ineffective to control operation of the engine and ineffective to interfere with control of the engine by operation of the manual controller device 16 at the engine. A stop rod braking cylinder device 44 is also provided which is operable in response to operation of the selector valve device 43 to brake the stop rod linkage 17' so that same will not interfere with control of the engine by the remote control apparatus when the engine is under its control from the pilot house.

In greater detail, the speed governor device 5 may, for the purpose of illustration, comprise a head 51 in which a plunger 52 is slidably mounted. Two centrifugal governor fly-ball arms 53 are pivoted on pins 54 in the head 51 and are operatively connected to a collar 55 secured to the plunger 52. The head 51 is operably connected by gears 56 and 57 to a rotary part of the engine such as the engine crank shaft 1. The plunger 52 is pivotally connected at 58 to one end of a lever 59, the opposite end of which lever is operatively connected through a link 60 and pins 61 and 62 to the fuel control lever 4 on the engine.

Intermediate its opposite ends, the lever 59 is pivotally connected to a fixed element 63 by means of a pin 64. A speed control spring 65 in the form of a tension spring is connected to lever 59 in such a manner as will bias the fuel control lever 4 toward its "Full fuel" position and the plunger 52 downwardly, as viewed in the drawing. Initial tension of the spring 65 will determine the speed setting of the governor device 5 and such tension or setting is controlled by the cylinder device 23, as will be described herein subsequently.

In operation of the governor device 5, if the engine is idle and the shaft 1 yet to turn, there will be no force acting through the plunger 52 on the lever 59 at one side of pin 64 tending to oppose action of the tension speed control spring 65 on said lever at the other side of said pin so that the spring 65 will urge the lever 59 toward the position in which it is shown in the drawing holding the fuel control lever 4 in its "Full fuel" position, in which position it also is shown in the drawing. As will hereinafter become obvious, the speed control cylinder device 23, in the position in which it is shown in the drawing, is so conditioned as to call for a minimum initial tension of the spring 65 acting on the lever 59, corresponding to an idling speed setting of the governor device 5, tending to hold the fuel control lever 4 in its "Full fuel" position, since the governor head 51 is not turning. It should be pointed out, however, that this minimum tension of the spring 65 is sufficiently great as to urge the fuel control shaft 4 toward its "Full fuel" position even though the engine may be turning over on starting air, as will be described hereinafter. When the engine is being turned over on starting air, the crank shaft 1 will turn at a certain speed, as therefore will the governor head 51 and arms 53, and such turning of the arms 53 will cause a force to be exerted upwardly on plunger 52 through the collar 55 which will tend to rock the lever 59 in a counterclockwise direction about the pin 64, as viewed in the drawing, but such force at this time will not be sufficient to effect such rocking against action of the spring 65, and said fuel control lever 4 will remain in its "Full fuel" position. With the spring 65 thus set at a minimum tension corresponding to an idling speed of the engine, when the engine fires and starts to run on fuel supplied thereto, the engine speed will tend to increase substantially over its previous certain speed when being turned over on starting air. As the engine speed thus increases above "Starting speed," the crankshaft 1, governor head 51 and fly-ball arms 53 will also increase in rotational speed, causing an increase in the centrifugal force of said arms to be exerted on stem 52 opposing the effect of the tension of the spring 65. As the centrifugal force on stem 52 thus increases with speed of the engine, same will overcome the action of the spring 65 and will cause, through rocking movement of the lever 59, the fuel control lever 4 to be moved in the direction of "Fuel off" position to diminish the amount of fuel supplied to the engine and thereby reduce its speed. The fuel control lever 4 thus will be moved in the direction of "Fuel off" position until a balance is reached between the action of spring 65 on lever 59 and the action of the centrifugal force of stem 52 on said lever. Such a balance at this time will occur at the intermediate "Idling fuel" position, corresponding to the idling speed setting of the governor device.

Once such balance thus has been established, so long as the tension of spring 65 remains set at its minimum value, the engine will continue to run at its idling speed in accord with the "Idling fuel" position of the fuel control lever 4 under control of the governor device, with a constant or no load condition imposed on the engine, which latter condition is usually the case while an engine is idling. By a subsequent increase in the tension of the spring 65, as through operation of the speed control cylinder device 23, the speed setting of the governor device 5 will be increased. The increased tension of spring 65 will cause a momentary unbalance in moments in the lever 59 which will respond to such unbalance to cause movement of the fuel control lever 4 out of "Idling fuel" position toward "Full fuel," causing an increase in fuel supply to the engine with a resulting increase in its speed, until a balance between action of said spring on lever 59 again reaches a balance with the action of plunger 52 on said lever. The speed of the engine thus will be maintained in accord with the speed setting of the governor device. When the tension of the spring 65 is set at a maximum value, the governor device 5 will position the fuel control lever 4 closer or to its "Full fuel" position, depending upon the load, to bring the engine up to full speed. If, while the engine is operating at a certain speed, a change in load on the engine occurs, such as an increase in load for example, the speed of rotation of crank shaft 1 and governor head 51 will tend to decrease and to reduce the centrifugal force acting on plunger 52, thereby allowing the spring 65 to move the fuel control lever 4 in the direction of "Full fuel" position to effect an increase in supply of fuel to the engine to maintain its set governor speed under the increased load. Conversely, the governor device 5 will maintain a constant speed of the engine should the load on the engine be reduced.

The cam shift cylinder device 10, for sake of illustration, may comprise an ahead cam shift piston 70 and an astern cam shift piston 71 secured to the racks 11 and 12, respectively, for actuating same. The ahead cam shift piston 70 is operable in response to supply of fluid under pressure to a chamber 72 to cause movement of the rack 11 to a lowermost position, in which it is shown as viewed in the drawing, thereby turning the cam shift gear 2 in a counterclockwise direction to move the engine cam shaft to its ahead position. During such downward movement of the piston 70, the rack 11, meshing with gear 2 and turning same will cause upward movement of piston 71 and rack 12 to an uppermost position in which they are shown in the drawing and which may be defined by contact with a shoulder 74. The astern cam shift piston 71 is operable from its uppermost position in response to supply of fluid under pressure to a chamber 73 to a lowermost position, carrying the rack 12 with it and thereby turning gear 2 in a clockwise direction to cause the engine cam shaft to assume its astern position. In turning clockwise, the gear 2 will cause the rack 11 and the ahead cam shift piston 70 to move to an uppermost position which may be defined by contact of said piston with an annular shoulder 74. Hereinafter, when the chamber 72 is supplied with fluid under pressure and the chamber 73 is vented to atmosphere the cam shift cylinder device 10 may be referred to as assuming its ahead position in which the piston 70 and rack 11 have been caused to assume their lowermost positions, the piston 71 and rack 12 have been caused to assume their uppermost positions, and the engine cam shaft has been caused to assume its ahead position to condition the engine for operation in its ahead direction. Conversely, hereinafter, when the chamber 72 is vented to atmosphere and the chamber 73 supplied with fluid under pressure, the cam shift cylinder device 10 may be referred to as assuming its astern position in which the piston 70 and rack 11 have been caused to assume their uppermost position, the piston 71 and rack 12 have been caused to assume their lowermost position, and the engine cam shaft has been caused to assume its astern position to condition the engine for operation in its astern direction.

The fluid pressure operable brake 13, for sake of illustration, may comprise a brake cylinder 75 having the usual piston 76 slidably disposed therein subject to pressure of fluid in a brake cylinder pressure chamber 77 at one side and to atmospheric pressure in a spring chamber 78 at the opposite side, chamber 78 being constantly open to atmosphere by way of a port 79. A piston return spring 80, disposed in chamber 78, is arranged to urge the piston 76 to a rest position in which it is shown in the drawing. Attached to the piston 76 by means of a rod 81 is a brake shoe 82 adapted for frictional engagement with such as the engine crank shaft 1 to effect stopping of the engine. Upon supply of fluid under pressure to the brake cylinder pressure chamber 77, the piston 76 will overcome action of the return spring 80 and bring the shoe 82 into braking engagement with the shaft 1, which action will hereinafter be referred to as applying the brake 13. When fluid under pressure is vented from the chamber 77, the spring 80 will return the piston 76 to its rest position with the shoe 82 disposed away from the shaft 1, which action will be referred to hereinafter as releasing the brake 13.

The fuel cut-off cylinder device 14, for sake of illustration, schematically, may comprise a casing 85 having a piston 86 slidably disposed therein, exposed on its one side to pressure of fluid in a pressure chamber 87 and to atmospheric pressure in a spring chamber 88 at its opposite side. The chamber 88 may be constantly open to the atmosphere by way of such as a port 89. A rod 90 is attached to the piston 86 for movement therewith which rod extends through chamber 88 and outwardly through the casing. Upon supply of fluid under pressure to the pressure chamber 87, the piston 86 will move from a rest position in which it is shown in the drawing to an opposite extreme position in the direction of the chamber 88, carrying the attached piston rod 90 with it, which rod is thereby moved to a further extended position projecting outwardly of the casing. The cylinder device 14 is so arranged relative to the fuel control lever 4 that movement of rod 90 outwardly of the casing causes the fuel control lever 4 to be moved to its "Fuel off" position for cutting off supply of fuel to the engine. A return spring 91 is disposed in the chamber 88 arranged to urge the piston 86 to its rest position upon release of fluid under pressure from chamber 87, with the rod 90 moved out of engagement with the fuel control lever 4.

In Fig. 1, the engine oil pressure interlock device 15 and the relay valve devices 18, 19, 26, 27, 31, 34, 41 for sake of illustration may be substantially alike. Referring to Fig. 2, each of the aforementioned devices may comprise a casing 100 having a diaphragm 101 disposed therein and subject to pressure of fluid in a diaphragm control chamber 102 on its one side and to pressure of fluid in a chamber 103 on its opposite side. Also formed in the casing are chambers 104, 105 and 106, chamber 104 being separated from chamber 103 by a partition 107 and from the chamber 105 by a partition 108. A partition 109 separates chamber 105 from the chamber 106. A valve 110 is disposed in chamber 104 for controlling communication between the chamber 105 and said chamber 104. The valve 110 may be secured to a fluted stem 111 slidably mounted in a suitable bore extending through the partition 108, a valve seat being formed at the end of the bore opening into the chamber 104 to accommodate the valve 110. A valve 112, similar to valve 110, is disposed in the chamber 106 for controlling communication between the chamber 105 and said chamber 106. The valve 112 is attached to a fluted stem 113 which is slidably disposed in a suitable bore extending through the partition 109, a valve seat being formed in the end of said bore opening into the chamber 106 to accommodate the valve 112. Both of the fluted stems 111 and 113 project into and meet in the chamber 105. A bias spring 114 is disposed in the chamber 106 arranged to urge the valve 112 toward its seat and at the same time, through engagement of stems 111 and 113, to urge the valve 110 away from its seat. The valve 110 is operably connected to the diaphragm 101 by means of a rod or stem 115 extending through a bore in the partition 107. A control spring 116 is provided in chamber 103 to oppose deflection of the diaphragm 101 in the direction of chamber 103.

In operation of the relay valve device shown in Fig. 2, with the chamber 103 open to atmosphere, upon supply of fluid under pressure to the control chamber 102 the diaphragm 101 will deflect in the direction of the chamber 103 against opposition of the control spring 116 and the bias spring 114 and will cause seating of the valve 110 and unseating of the valve 112. With the valve 110 closed and the valve 112 open, chamber 105 will be closed to the chamber 104 and open to the chamber 106. Upon subsequent venting of fluid under pressure from the control chamber 102, the bias spring 114 and the control spring 116 will return the diaphragm 101 and valves 110 and 112 to the positions in which they are shown in the drawing, the valve 112 being seated and the valve 110 being unseated. With valve 110 unseated and the valve 112 seated, the chamber 105 will be closed to the chamber 106 and open to the chamber 104. If, at the time that fluid under pressure is supplied to the control chamber 102, the chamber 103 is charged with fluid at substantially the same pressure as that in said chamber 102, it will be seen that the effect of the pressure at one side of the diaphragm will balance the effect of pressure on the opposite side and said diaphragm will not deflect, but rather will remain stationary with the valve 112 remaining seated and the valve 110 remaining unseated. If, while the control chamber 102 and chamber 103 are charged with fluid under pressure and the diaphragm is thus stationary, the fluid under pressure is vented from chamber 103, the pressure of fluid in said control chamber will then deflect the diaphragm to seat valve 110 and unseat the valve 112 as aforedescribed. If, on the other hand, with the control chamber 102 charged with fluid under pressure, diaphragm 101 thus deflected and the chamber 103 vented to atmosphere, fluid under pressure is then supplied to the chamber 103 to balance the pressure forces on the diaphragm 101, the springs 114 and 116 will return the diaphragm and valves 110 and 112 to the positions in which they are shown in the drawing. The valve 112 will again be seated and the valve 110 unseated.

Hereinafter, in describing operation of any of the valve devices in the apparatus which are similar to the device shown in detail in Fig. 2, when the valve 110 is unseated and the valve 112 is seated a communication, to be hereinafter designated 118, will be established connecting the chamber 105 to the chamber 104, and when the valve 110 is seated and the valve 112 unseated, a communication, to be hereinafter designated 119, will be established connecting the chamber 105 to the chamber 106. When either of communications 118 or 119 is established, the other is disestablished. The communication 118 is indicated symbolically in the different valve devices in the apparatus shown in Fig. 1 by a solid line bearing the reference numeral 118 and the communication 119 is indicated by a dash line bearing the reference numeral 119.

In the engine oil pressure interlock device 15, its control chamber 102 is adapted to be connected to a lubricating oil pressure line (not shown) in the engine by way of such as a pipe 119a so that when the engine is turning over, said control chamber will be pressurized by the engine lubricating oil, and when the engine stops turning over, pressure of oil in said control chamber will be dissipated with the engine oil pressure. In the device 15, its communication 118 connects the pipe 212 to atmosphere through a pipe 119b containing a choke 119c and its communication 119 connects said pipe 212 to a pipe 119d which is plugged.

Referring to Fig. 3, for sake of illustration the manual controller device 16, shown in outline in Fig. 1, may comprise a casing 120 having a ventilating valve mechanism 121, a stop valve mechanism 122, an ahead valve mechanism 123, an astern valve mechanism 124, a supply control valve mechanism 125, and a start control valve mechanism 126.

The ventilating valve mechanism 121 may comprise a valve 127 arranged to control communication between a chamber 128 and a chamber 129. The chamber 129 has a connection with a branch of a start pipe 130 which is in turn connected to starting air valves (not shown) on the engine. When the pipe 130 is supplied with fluid under pressure the starting air valves respond to effect supply of starting air to the engine, and when the pipe 130 is vented to atmosphere, the starting air valves respond to terminate supply of starting air to the engine. The chamber 128 in mechanism 121 is connected by way of a pipe 96 to the chamber 105 in a ventilating relay valve device 132, which is similar in structure to the device shown in detail in Fig. 2, for reasons which will hereinafter become obvious. The valve 127 in mechanism 121 is attached to a stem 133 adapted to be actuated by a cam 134 for unseating said valve. A spring 135 disposed in the chamber 129 is arranged to urge the stem 133 in the direction of cam 134 and the valve 127 toward a seated position closing the chamber 128 from the chamber 129. The stem 133 extends through a bore in a partition separating the chambers 128 and 129. The portion of the stem 133 which extends through the bore may be fluted to allow for open communication between the chambers 128 and 129 when the valve 127 is unseated.

The stop valve mechanism 122, the ahead valve mechanism 123, the astern valve mechanism 124, and the supply control valve mechanism 125 may be substantially alike. Each of the mechanisms 122, 123, 124 and 125 comprises a casing having a fluid pressure supply chamber 138, a delivery chamber 139 and an exhaust chamber 141, said mechanisms further comprising respectively supply valves 137a, 137b, 137c and 137d for controlling communication between the respective supply chambers 138 and delivery chambers 139, and release valves 140a, 140b, 140c and 140d for controlling communication between the respective delivery chambers 139 and exhaust chambers 141. The supply valves 137a, 137b, 137c, 137d and release valves 140a, 140b, 140c, 140d are disposed in the respective chambers 138 and 141, and said supply and release valves are attached to fluted stems 143 and 144, respectively, which extend through bores in the casing and project into and meet in the respective chambers 139. A compression spring 145 acts on each of the supply valves 137a, 137b, 137c and 137d to urge it toward a seated position and through engagement of the respective stems 143 and 144 at the same time urging the respective release valves 140a, 140b, 140c, 140d toward an unseated position. A stem 146 is attached to each of the valves 140a, 140b, 140c, 140d for, against opposition of the respective spring 145, actuating said valve 140 to a closed position and at the same time actuating the respective valves 137a, 137b, 137c, 137d toward an open position. The stems 146 of the mechanisms 122, 123, 124, 125 extend outwardly of the casing into engagement with cams 147, 148, 149 and 150, respectively, which together with cam 134 are secured for turning movement with the control cam shaft 17 to control the position of said stems and hence control said valve mechanisms. In each of the valve mechanisms 122, 123, 124, the exhaust chamber 141 is open to atmosphere by way of such as a port 151 in the casing, and the supply chamber 138 is connected to the delivery chamber 139 in the valve mechanism 125. The supply chamber 138 in the valve mechanism 125 is connected to a source of fluid under pressure such as a fluid pressure storage reservoir 152 by way of such as a branch of a supply pipe 153. The start control valve mechanism 126 may comprise a valve 154 for opening and closing a supply chamber 155 to a delivery chamber 156. The supply chamber 155 is adapted to be supplied with fluid under pressure from such as the supply pipe 153 by way of such as a passage 157 and the supply chamber 138 in the valve mechanism 125. The delivery chamber 156 in the mechanism 126 is connected to a branch of the start control pipe 130. The valve 154 is attached to a fluted stem 158 slidably and guidably disposed in a bore opening through a partition dividing the chambers 155 and 156. A compression spring 159 may be arranged to act on the stem 158 to urge the valve 154 toward an unseated position, opening the delivery chamber 156 to the supply chamber 155. A stem 160 is attached to the valve 154 through which said valve may be actuated to a seated position against opposition of the spring 159, closing off the delivery chamber 155 from the supply chamber 156. The stem 160 extends outwardly of the casing into engagement with a cam 161 secured for turning movement with the shaft 17.

In a "Stop (no air)" or neutral position of the manual controller device 16, in which position it is shown in the drawing, the hand wheel (not shown), shaft 17 and the cams 134, 147, 148, 149, 150 and 161 are so positioned that in the ventilating valve mechanism 121 the valve 127 is unseated, in the stop valve mechanism 122 the valve 140a is seated and the valve 137a unseated, in each of the valve mechanisms 123, 124 and 125 the valves 137b, 137c and 137d are seated and the valves 140b, 140c and 140d unseated, and in the start control valve mechanism 126 the valve 154 is seated.

In the ahead relay valve device 18, which is similar to that shown in detail in Fig. 2, its chamber 106 is connected to the fluid pressure supply pipe 153, its chamber 105 is connected to the chamber 72 in the cam shift cylinder device 10 by way of a pipe 162, its chamber 104 is connected by way of a pipe 163 to the chamber 139 in the ahead valve mechanism 123 and thence to atmosphere with device 16 in its "Stop" position, and lastly its chamber 103 is connected to atmosphere by way of such as a port 164. In operation of the remote (pilot house) control apparatus, upon supply of fluid under pressure to its control chamber 102, the relay valve device 18 will respond to disestablish its communication 118 and establish its communication 119 connecting the supply pipe 153 to the pipe 162 to effect supply of fluid under pressure to the chamber 72 in the cam shift cylinder device 10, and upon release of fluid under pressure from its control chamber, said relay valve device 18 will respond to disestablish its communication 119 and establish its communication 118 connecting the pipe 162 to the pipe 163 and hence to atmosphere via the device 16 in "Stop" position. Thus it will be seen that the ahead relay valve device 18 is operable to control supply and release of fluid under pressure to and from the chamber 72 in the cam shift cylinder device 10 when the remote control apparatus is in operation. According to a feature of the invention, when the remote control apparatus is not in operation, with control chamber 102 in the ahead relay valve device 18 vented and said device therefore establishing its communication 118, the manual controller device 16 may be operated, as will be described hereinafter, to effect supply and release of fluid under pressure to and from the chamber 72 in the cam shift cylinder device 10 by way of pipes 162 and 163 and the communication 118 in said relay valve device 18.

Similarly, in the astern relay valve device 19, which, as hereinbefore mentioned, is also similar to that shown in detail in Fig. 2, its chamber 106 is also connected to the fluid pressure supply pipe 153, its chamber 105 is connected to the chamber 73 in the cam shift cylinder device 10 by way of such as a pipe 166, its chamber 104 is connected by way of a pipe 167 to the chamber 139 in the astern valve mechanism 124 which is connected to atmosphere when the device 16 is in its neutral or "Stop" position, and lastly, its chamber 103, like the corresponding chamber in device 18, is connected to atmosphere by way of a similar port 164. In manner similar to operation of the ahead relay valve device 18, in operation of the remote or pilot house control apparatus, the astern relay valve device 19 will respond to disestablish its communication 118 and establish its communication 119 connecting the supply pipe 153 to the pipe 166 to cause actuation of the cam shift cylinder device 10 to its astern position, and upon release of fluid under pressure from its control chamber said astern relay valve device will respond to disestablish its communication 119 and establish its communication 118 connecting the pipe 166 to the pipe 167 and hence to atmosphere by way of the device 16 in its "Stop" position. It will be seen that the astern relay valve device 19 is operable to control supply and release of fluid under pressure to and from the chamber 73 in the cam shift cylinder device 10 when the remote control apparatus is in operation. According to a feature of the invention, when it is desired to control actuation of the cam shift cylinder device 10 to its astern position by means of the controller device 16 at the engine, with the control chamber 102 in the astern relay valve device 19 vented to atmosphere, fluid under pressure may be supplied to and released from the chamber 73 in said device 10 by operation of said device 16 by way of the communication 118 in said astern relay valve device.

By employment of such an arrangement, the control system is somewhat simplified, eliminating the necessity for additional selective valves or the like, in that the device 16 and the relay valve devices 18 and 19 have cooperative functions whether control of the engine be effected by operation of said device 16 at the engine or by operation of the engine from the pilot house, as will hereinafter become obvious.

The ahead and astern cam shift interlock devices 20 and 21, respectively, may be alike, and for sake of illustration, each may comprise a casing 170 having a supply chamber 171, a delivery chamber 172, and an exhaust chamber 173 formed in the casing. A partition 174 formed in the casing divides the delivery chamber 172 from the supply chamber 171, and a similar partition 175 divides the delivery chamber 172 from the exhaust chamber 173. Aligned bores open through the partitions 174 and 175 and form respective communications between the delivery chamber 172 and the supply chamber 171 and between said delivery chamber and the exhaust chamber 173. A supply valve 176 is disposed in the supply chamber 171 for controlling communication through the bore in the partition 174, and a release valve 177 is disposed in the exhaust chamber 173 for controlling communication through the bore in the partition 175. The valves 176 and 177 are attached to fluted stems 178 and 179, respectively, which stems project through the respective bores in the partitions 174 and 175 and into the delivery chamber 172. A compression spring 180 is disposed in the chamber 171 arranged to urge the valve 176 toward a seated position to close the delivery chamber 172 from the supply chamber 171. The fluted stems 178 and 179 are of such length only one of the valves 176 and 177 will seat at one time. When the valve 176 is urged by the spring 180 to seat, through engagement of the stems 178 and 179, the valve 177 is caused to unseat. A stem 181 is attached to the valve 177 through the medium of which said valve 177 may be moved to its seated position, simultaneously unseating the valve 176 against opposition of the spring 180. The stem 181 is in turn arranged to be actuated through movement of a follower arm 182 pivotally connected at its one end to the casing 170 and provided at its opposite end with a roller follower 183 for rolling engagement with a cam surface 184 provided on the respective rack 11 or 12. The devices 20 and 21 are so mounted relative to the racks 11 and 12 that through engagement of each roller 183 with a flat portion of the cam surface 184, the stem 181 is held in a displaced position inwardly of the casing 170 by the arm 182, with the release valve 177 consequently seated and the supply valve 176 unseated. When the ahead cam shift piston 70 is in its rest position seated against shoulder 74, the rack 11 attached to it is positioned to present a recess 185 to the follower 183 of device 21, allowing the spring 180 in said device to seat its supply valve 176 and unseat its release valve 177 by displacement of the stem 181 outwardly of the casing with angular movement of arm 182 as the follower 183 drops into the recess 185. Similarly, a corresponding recess is presented to the follower 183 of the device 20 when the astern cam shift piston 71 is in its rest position, in which it is shown in the drawing, with the valves 176 and 177 in said device consequently seated and unseated respectively.

In the ahead relay valve device 18 the control chamber 102 is connected to the delivery chamber 172 in the ahead interlock device 20 by way of a choke 190 and a check valve device 191 arranged in parallel in a pipe or pipes 192. The check valve device 191 allows for rapid flow of fluid under pressure to the control chamber in the device 18, while the choke 190 allows for slow release of fluid under pressure from said control chamber for reasons which will become obvious hereinafter.

Similarly, in the astern relay valve device 19 the respective control chamber 102 is connected to the delivery chamber 172 in the astern interlock device 21 by way of a choke 193 and a check valve device 194 arranged in parallel in a pipe or pipes 195 in such a manner that fluid under pressure may flow rapidly to said control chamber via the check valve device and may be released from said control chamber at a slower rate via the choke.

The exhaust chamber 173 in each of the interlock devices 20 and 21 is open to atmosphere by way of such as a port 187.

Each of the pipes 192 and 195 has a branch which is connected to a respective inlet opening of the double check valve device 33 which may be of any suitable type, but for sake of illustration may be substantially like that shown in section in Fig. 4. Referring to Fig. 4, the double check valve device 36 as well as the double check valve devices 37, 38, 39, and 40 each may comprise a hollow substantially cylindrical casing 200 having a bore 201 extending longitudinally therethrough. One end of the bore 201 may be closed by an end member 202 suitably secured to the casing 200 by means not shown, and the opposite end of said bore may be closed by an end member 203 similar to number 202. Resilient seat members 204 and 205 may be clamped between the casing 200 and the members 202 and 203, respectively, at opposite ends of the bore 201 for seating and sealing engagement with a piston valve element 206 which is slidably disposed in the bore 201. One inlet opening 207 to the double check valve device 36 may extend through the end member 202 and seat member 204 into one end of the bore 201, while another inlet opening 208 may extend through the end member 203 and seat member 205 into the opposite end of said bore. The length of the piston valve element 206 is considerably less than the length of the casing 200, and when fluid under pressure is supplied to the inlet opening 207 with the inlet opening 208 vented to atmosphere said piston element will move from the position in which it is shown in Fig. 4 to an opposite position seated on the seat member 204. Conversely, when fluid under pressure is supplied to the inlet opening 208 with the inlet opening 207 vented to atmosphere, the piston valve element 206 will move to the position in which it is shown in the drawing seated against the seat member 204. Intermediate opposite ends of the bore 201 the double check valve device 36 is provided with an outlet opening 209 opening radially into said bore. When the piston valve element 206 is in the position in which it is shown in the drawing seated against the seat member 204, the outlet opening 209 is closed to the inlet opening 207 and open to the inlet opening 208 by way of the bore 201, and when the piston valve element 206 is caused to assume its opposite position seated against the seat member 205, the outlet opening 209 is closed to the inlet opening 208 and open to the inlet opening 207 by way of the bore 201.

The pipe 195 may be assumed to be connected to the inlet opening 207 of the double check valve device 36, and the pipe 192 may be connected to the inlet opening 208 of said device. The outlet opening 209 of the double check valve device 33 is connected via a pipe 210 and branches thereof to the chamber 103 in the start interlock device 34, which is similar to the device 15 aforedescribed, to the control chamber 102 in the brake relay valve device 26, which also is similar to said device 15; and to one inlet opening, such as the inlet opening 207, of the double check valve device 40 which is similar to the double check valve device 36 above described.

In the brake control relay valve device 26, its chamber 106 is connected to the fluid pressure supply pipe 153, its chamber 104 may be connected to such as a pipe 211 since the device 26 may be standard and an opening therein provided for such connection but in the present application this pipe 211 will be plugged, its chamber 103 will be open to atmosphere by way of such as the port 164, and its chamber 105 is connected by way of a pipe 212 and branches thereof to the brake cylinder pressure chamber 77, to the inlet opening 207 of the double check valve device 40, to the inlet opening 208 of the double check valve device 39, to the chamber 139 in the start valve mechanism 122 in the manual controller device 16, to the chamber 105 in the oil interlock device 15 and to the chamber 103 in the start interlock device 31 by way of a pipe 213 and a reducing valve device 214 connecting pipe 213 to the pipe 212.

In the start relay valve device 27, its chamber 106 is connected to a branch of the fluid pressure supply pipe 153, its chamber 104 is connected to atmosphere by way of such as a pipe 215, its chamber 105 is connected to the start pipe 130 by way of a pipe 213 and a check valve device 217 which allows for flow of fluid under pressure only from said chamber 105 to said pipe 130 and prevents flow in the opposite direction, and its chamber 103 is connected to atmosphere by way of such as the port 164.

The fuel limit cylinder device 28 may comprise a hollow cylindrical casing 220 having a fuel limit piston 221 slidably disposed therein and exposed to a fuel limit pressure chamber 222 at one side and to a spring chamber 223 at its opposite side. A return spring 224 is disposed in the spring chamber 223 and arranged to urge the piston 221 in the direction of the pressure chamber 222 toward a rest position in which it is shown in the drawing. Upon supply of fluid under pressure to the pressure chamber 222 the piston 221 will move in the direction of the chamber 223 against opposition of the spring 224 toward a position defined by such as full compression of said spring, and upon release of fluid under pressure from said chamber 222, the spring 224 will cause return of the piston 221 to its rest position in which it is shown in the drawing. Attached to the piston 221 is a fuel limit rod 225 which extends through the chamber 223 and outwardly through an end wall of the casing 220. A fuel limit arm 226 is attached to the fuel control lever 4 for engagement by the fuel limit rod 225 to actuate said fuel control lever to a "Fuel limit" position, indicated by a dot-and-dash line so titled in the drawing, intermediate its "Full fuel" and "Idling fuel" position when starting the engine as will be described hereinafter. When, upon supply of fluid under pressure to the chamber 222, the piston 221 moves from its rest position to its opposite position, the fuel limit rod 225 will engage the fuel limit arm 226 and move the fuel control lever 4 from its "Full fuel" position to its "Fuel limit" position or otherwise limit movement of said fuel control lever in the direction of "Full fuel" to "Fuel limit." When upon release of fluid under pressure from the chamber 222 the fuel limit piston 221 returns to its rest position, the fuel limit rod 225 will assume a position, such as the position in which it is shown in the drawing, in which movement of the fuel control lever 4 in the direction of "Full fuel" position will not be limited thereby.

The cam shift lock and cylinder arrangement 29 may comprise a hollow unlocking cylinder 227 having a piston 228 slidably disposed therein. Upon supply of fluid under pressure to a pressure chamber 229, the piston 228 will move in a direction away from its rest position in which it is shown in the drawing against opposition of a return spring 230 to cause movement of a latch element 231 out of locking engagement with the rack 11, the piston 228 being operatively connected to said latch element through the medium of a piston rod 232, a pin connected bell crank lever 233 and a link 234. Upon release of fluid under pressure from the chamber 229, the spring 230 will urge the piston 228 to assume its rest position and in so doing, through the medium of the rod 232, the lever 233 and the link 234, will urge the latch element 231 into engagement with the rack 11. If the rack 11 is in either of its extreme limit positions, that is if the cam shift cylinder device 10 is in either its ahead or its astern position, a recess 236 in the rack 11 will be presented in alignment with the latch element 231 into which same may project, allowing the piston 228 to assume its rest position in which it is shown in the drawing and locking the rack 11, and thereby the cam shift gear 2 in place once it has been caused to assume either its ahead or its astern position. If, when fluid under pressure is vented from the chamber 229, the latch element 231 is urged into engagement with the rack 11 intermediate the recesses 236, such engagement will only slightly oppose movement of the rack 11 to either of its opposite limit positions and is not intended to prevent such movement until the cam shift gear has attained either its ahead or its astern position, at which time the latch element drops into a respective recess 236.

The directional interlock device 30 may be substantially like that disclosed and described in detail in the United States Patent No. 2,459,883 of Cecil S. Kelley issued January 25, 1949 and assigned to the assignee of the present application. Since reference may be made to the above patent for a detailed description of the directional interlock device 30, only a brief description thereof is included in the present application. Briefly, therefore, the directional interlock device 30 is operable in response to supply of fluid under pressure to a pipe 240 to sense the direction of rotation of the engine crank shaft 1, through actuation of a retractible shoe 241 into engagement with said shaft, and to establish communication between one or the other of a respective ahead or astern control pipe 242 or 243 and a pipe 244 connected to the inlet opening 208 of the double check valve device 37, according to such direction of rotation and to maintain such communication when fluid under pressure is vented from the pipe 240, with resultant retraction of the shoe 241 to a rest position in which it is shown in the drawing away from the shaft 1. If the engine crank shaft 1 is turning in its ahead direction when the shoe 241 is caused to engage said shaft, the directional interlock device 30 will respond to establish communication between the astern control pipe 243 and the pipe 244 and at the same time disestablish communication between the ahead control pipe 242 and said pipe 244. Conversely, if the shaft 1 is rotating in its opposite or astern direction at the time that the shoe 241 is in engagement with said shaft, the directional interlock device 30 will respond to disestablish communication between the astern control pipe 243 and the pipe 244 and at the same time establish communication between the ahead control pipe 242 and the pipe 244. If the shaft 1 is not rotating at the time that the shoe 241 is in engagement with said shaft, the interlock device 30 will maintain establishment of the communication previously established during a previous engagement of said shoe and shaft.

In the start interlock device 31, its chamber 106 is connected to a start control pipe 245, its chamber 104 is connected to atmosphere by way of such as a pipe 246, its control chamber 102 is connected by way of a pipe 247 to the outlet opening 209 of the double check valve device 38, its chamber 105 is connected to the pipe 240, and as aforementioned, its chamber 103 is connected to the pipe 213.

The pipe 240, besides having a connection with the directional interlock device 30 is also connected to the fuel limit pressure chamber 222, to the control chamber 102 in the relay valve device 132 and to the corresponding control chamber in the start relay valve device 27.

The speed interlock device 33 shown in outline in Fig. 1, for sake of illustration, referring to Fig. 5 may comprise a casing 250 having a supply chamber 251 connected to a fluid pressure supply pipe 252 as a source of fluid under pressure, a delivery chamber 253 connected by way of a pipe 254 to the inlet opening 207 of the double check valve device 38, and an exhaust chamber 255 connected to the atmosphere by way of a port 256. A supply valve 257 is disposed in the supply chamber 251 for controlling communication between said supply chamber and the delivery chamber 253 by way of an opening in a partition 258 separating the one chamber from the other. A seat is formed in the partition encircling the opening therein to accommodate the supply valve 257. A compression spring 259 is also disposed in the supply chamber 251 and arranged to urge the supply valve 257 toward a seated position to close said supply chamber from the delivery chamber 253. The supply valve 257 is connected, by means of a stem 260 extending with clearance through the opening in the partition 258, to an exhaust valve seat element 261 which is slidably mounted in the casing and which separates the delivery chamber 253 from the exhaust chamber 255. An opening 262 extends from one end of the exhaust valve seat element 261 into the stem 260 and outwardly therefrom into the delivery chamber 253 to serve as a communication for connecting said delivery chamber to the exhaust chamber 255. An exhaust valve 263 is disposed in the exhaust chamber 255 and arranged to cooperate with the seat element 261 to close said chamber 255 to the opening 262 when valve 263 is seated. A stem 264 is attached to the exhaust valve 263 and is arranged for contact with a cam 265 which is secured for turning movement with the fuel control lever 4. The cam 265 is provided with a raised portion 265a which remains in engagement with the stem 264 from "Full fuel" position of the lever 4 substantially to its "Idling fuel" position. Substantially at the time that the fuel control lever 4, in moving from the direction of its "Full fuel" position, assumes its "Idling fuel" position, a recessed portion 265b of the cam 265 is presented to the stem 264, which recessed portion remains so presented while the fuel control lever assumes positions at or intermediate "Idling fuel" and "Fuel off" positions. When the raised portion of the cam 265 is in engagement with the stem 264, same will be depressed inwardly of the casing 250, holding the supply valve 257 unseated from its seat in the partition 258 through seated engagement of the exhaust valve 263 on its seat in the seat element 261. Under such conditions, the supply chamber 251 is open to the delivery chamber 253 by way of the unseated supply valve 257 and the opening in the partition 258, while said delivery chamber is closed to the exhaust chamber 255 by the seated exhaust valve 263. Hence, when the raised portion of the cam 265 is in engagement with the stem 264, or in other words, when the fuel control shaft 4 is positioned intermediate its "Full fuel" position and its "Idling fuel" position, the pipe 254 will be connected to the fluid pressure supply pipe 252. When the recessed portion of the cam 265 is presented to the stem 264, the spring 259 is able to seat the supply valve 257 and sufficient clearance is afforded between the cam 265 and stem 264 to allow fluid under pressure in the delivery chamber 253 to unseat the exhaust valve 263 and blow to atmosphere by way of the opening 262 in the seat element 261, the exhaust chamber 255 and the port 256. Thus it will be seen that when the fuel control lever 4 is positioned in or intermediate its "Idling fuel" and "Fuel off" positions, the pipe 254 will be disconnected from the supply pipe 252 and will be connected to atmosphere.

In the stop interlock device 34, its chamber 103 is connected as aforementioned to the pipe 210, its chamber 105 is connected to the inlet opening 207 of the double check valve device 37 by way of a pipe 270, its chamber 106 is connected to atmosphere by way of such as a pipe 271, its chamber 104 is connected to the fluid pressure supply pipe 252, and its control chamber 102 is connected, by way of a pipe 273 and its branches, to the chamber 103 in the decompression relay valve device 41 and to the outlet opening 209 in the double check valve device 35. The inlet opening 207 in the double check valve device 35 is connected to the astern control pipe 243 and the opening 208 in said device is connected to the ahead control pipe 242.

The outlet opening 209 of the double check valve device 37 is connected by way of a pipe 275 and branches thereof to the inlet opening 208 in the double check valve device 38 and to the inlet opening 207 in the double check valve device 39.

The outlet opening 209 of the double check valve device 39 is connected by way of a pipe 276 to the chamber 87 in the fuel cut-off cylinder device 14.

The outlet opening 209 in the double check valve device 40 is connected by way of a pipe 277 to the chamber 229 in the unlocking cylinder 29.

In the decompression relay valve device 41 its chamber 106 is connected to the fluid pressure supply pipe 153, its chamber 104 is connected to the atmosphere by way of such as a pipe 278, and its chamber 105 is connected to decompression valves on the engine by way of a pipe 279 and a check valve 280 inserted therein, the check valve 280 allowing for flow of fluid under pressure only in the direction of the decompression valves.

The push button type of valve device 42 may, for sake of illustration, comprise a supply valve 281 for controlling communication between a supply chamber 282 and a delivery chamber 283, and a release valve 284 for controlling another communication between said delivery chamber and an exhaust chamber 285. The valves 281 and 284 may be disposed in the chambers 282 and 285, respectively, and may be attached to fluted stems 286 and 287, respectively, which extend through respective bores in the casing of the device and project into and meet in the chamber 283. A compression spring 288, disposed in the chamber 282, is arranged to urge the valve 281 toward a seated position for closing off the delivery chamber 283 from the supply chamber 282, and through engagement of the stems 286 and 287 to at the same time urge the valve 284 toward an unseated position for opening the delivery chamber to the exhaust chamber 285. A stem 289 is attached to the valve 284 to act as a medium through which same may be actuated to a closed position and the valve 281 to an open position, against opposition of the spring 288. The stem 289 extends through the chamber 285 and outwardly of the casing, being provided at its outer projecting end with a push button 290 through which same may be actuated manually. In the device 42, the supply chamber 282 is connected to a fluid pressure supply pipe 252, the exhaust chamber 285 is connected to atmosphere by way of such as a port 291, and the delivery chamber 283 is connected to the control chamber 102 in the decompression relay valve device 41 by way of a pipe 292. Normally, the valves 281 and 284 assume the positions in which they are shown in the drawing, i. e. seated and unseated, respectively, so that the pipe 292 will be open to atmosphere via the unseated valve 284.

The selector valve device 43 may be of any well known structure, but for sake of illustration may simply comprise a rotary valve 295 adapted to assume two positions, one for connecting the fluid pressure supply pipe 252 to the fluid pressure supply pipe 153 by way of a reducing valve device 297, and another for disconnecting the supply pipe 252 from the supply pipe 153 and for connecting said pipe 252 to the atmosphere via a port 298. A handle 300 may be provided for actuating the rotary valve 295 and the two positions thereof may be indicated by position of the handle, which two positions might be named "Pilot house" and "Engine room," respectively, for reasons which will hereinafter become obvious. By provision of the reducing valve 297, the supply pipe 252 will act as a source of low pressure fluid, such as at one hundred pounds, for operating relay valve devices and the like, while the reservoir 152 and supply pipe 153 will act as a source of high pressure fluid, such as at two hundred and fifty pounds, for operating the brake 13 and the cam shift cylinder device 10, for example.

The stop rod breaking cylinder device 44 may simply comprise a casing having a piston 301 slidably disposed therein and subject oppositely to pressure of fluid in a chamber 302 at its one side and to the force of a spring 303 at its opposite side. A rod and yoke arrangement 304 is attached for actuation by the piston 301 and is operatively connected to the stop rod linkage 17'. The chamber 302 is connected to the fluid pressure supply pipe 252, and when same is pressurized, i. e. when it is desired to control operation of the engine from the pilot house as will be seen hereinafter, the piston 301 assumes the position in which it is shown in the drawing holding the rod and yoke arrangement 304 positioned to break the stop rod linkage 17' so as to allow the fuel control shaft 3 and the lever 4 to assume its "Full fuel" position. When the fluid pressure supply pipe 252 is vented to atmosphere to allow for control of the engine from the engine room without interference from the pilot house as will be seen hereinafter, the spring 303 will effect movement of the piston 301 and rod and yoke arrangement 304 to cause the stop rod linkage 17' to assume an aligned position, in which position it will cause the fuel control shaft 3 and lever 4 to be moved to its "Fuel off" position when the cam shaft 17 is in its "Stop" position, the latter being accomplished through engagement of an element 306 attached to linkage 17' with an arm 307 attached to the fuel control shaft 3.

In the ventilating relay valve device 132, besides what has been aforedescribed, its chamber 103 is connected to atmosphere by way of such as the port 164, its chamber 106 may be connected to a pipe 310 to allow for use of a standard relay valve device, but in the present application this pipe 310 is plugged, and its chamber 104 is connected to the atmosphere by way of such as a pipe 311.

The speed control cylinder device 23, for sake of illustration, may comprise a casing having a piston 315 slidably disposed therein and subject opposingly to pressure of fluid in a pressure chamber 316 at its one side and to force of a compression spring 317 in a chamber open to atmosphere on its opposite side. The piston 315 is operatively connected to one end of the speed control tension spring 65 through the medium of a piston rod 318. The spring 317 urges the piston 315 toward the position in which it is shown in the drawing in which the initial tension of the spring 65 is at a minimum value calling for an idling speed setting of the governor device 5 as aforementioned. The chamber 316 in cylinder device 23 is connected to a speed control pipe 319 which is in turn connected to the operator's control device 22 in the pilot house. By an increase in pressure in the chamber 316 effected via the speed control pipe 319 up to a certain maximum value, the piston 315 may be caused to assume positions in the direction of the spring 317 to cause an increase in the tension of the spring 65 according to the degree of such increase in pressure, thereby increasing the speed setting of the governor device up to a full speed setting corresponding to said maximum value. By subsequent controlled reduction in pressure of fluid in the chamber 316 as effected via the speed control pipe 319, the initial tension of the spring 65 may be reduced as the spring 317 causes the piston 315 to move toward the position in which it is shown in the drawing, corresponding to such as a minimum or atmospheric pressure in the speed control pipe 319 and the idling speed setting of the governor device 5. It will be appreciated that any position of the piston 315 between its opposite extreme limit positions corresponding to idling and full speed setting of the governor device 5, respectively, may be effected according to pressure of fluid in the chamber 316. Speed of operation of the engine while running on fuel, will be in accord with the speed setting of the governor device 5 as determined by the pressure of fluid in the speed control pipe 319 through the medium of the cylinder device 23.

The operator's control device 22 may be similar to that shown and described in detail in the United States Patent No. 2,413,390 issued to Roy R. Stevens December 31, 1946, and assigned to the assignee of the present application. For a detailed description of the device 22, reference may be made to that patent.

Briefly, therefore, the operator's control valve device 22 comprises valve means (not shown) for controlling establishment of pressure of fluid in the ahead, astern, and start control pipes 242, 243 and 245, respectively, and for effecting variations in pressure of fluid in the speed control pipe 319. An operator's control lever 320, operable manually, is provided for controlling operation of the valve means.

The lever 320 extends through a guide slot 321 and has a "Stop" position intermediate the ends of said slot. At one side of "Stop" position, indicated in the drawing by a legend "Ahead," the lever 320 has a "Run and idle" position which is located substantially midway between "Stop" position and one end of the slot where said lever has a "Full speed" position. Adjacent to the "Run and idle" position, the slot 321 opens to a transverse slot 322 to allow for movement of the lever 320 to a "Start" position. At the opposite side of "Stop" position, indicated by the legend "Astern," the lever 320 has oppositely arranged corresponding "Run and idle" and "Full speed" positions, and has a similar "Start" position disposed opposite to "Run and idle" in a slot 323.

In "Stop" position of the lever 320, the valve means (not shown) controlled by said lever are positioned to open the ahead, astern, speed, and start control pipes 242, 243, 319 and 245, respectively, to atmosphere. In "Run and idle" position at the "Ahead" side of "Stop" position, the valve means controlled by lever 320 are conditioned to effect pressurization of the ahead control pipe 242 while venting the astern, start and speed control pipes 243, 245 and 319 to atmosphere. By moving the lever 320 into the slot 322, the start control pipe 245 is pressurized in addition to the ahead control pipe 242. In "Run and idle" position of the lever 320, at the opposite or "Astern" side of "Stop" position, the astern control pipe 243 is charged with fluid under pressure while the ahead, start, and speed control pipes 242, 245 and 319 are vented to the atmosphere. Upon movement of the lever 320 into the slot 323, the start control pipe 245 is charged with fluid under pressure in addition to the astern control pipe 243.

When the lever 320 is in either of the "Run and idle" positions, the speed control pipe 319 is open to atmosphere, as above mentioned, for rendering the speed control cylinder devices 23 effective to call for the idling speed setting of the governor device 5, while upon movement of the operator's control lever 320 to either of the "Full speed" positions, fluid at a maximum degree of pressure is provided in the speed control pipe 319 for rendering the speed control cylinder device 23 effective to increase the initial tension of the spring 65 for a full speed setting of the governor device 5. Any desired intermediate pressure may be secured in the speed control pipe 319 by suitable adjustment of the operator's control lever 320, between either of the "Run and idle" positions and the corresponding "Full speed" position.

While the lever 320 is being positioned within the range between "Run and idle" and "Full speed" on the "Ahead" side of "Stop" position, the ahead control pipe 242 will remain charged, and conversely, while said lever is positioned within the opposite corresponding range on the "Astern" side of "Stop" position, the astern control pipe 243 will remain charged.

*Operation of the remote control apparatus*

In operation of the apparatus for controlling operation of the engine from the pilot house, let it be assumed that the reservoir 152 is charged with fluid under pressure from a source thereof, such as a compressor (not shown), so that the high pressure supply pipe 153 is charged with fluid under pressure from the reservoir 152; that the selector valve device 43 is in its "Pilot house" position and the low pressure supply pipe 252 is therefore charged with fluid under pressure from the high pressure supply pipe 153 by way of the reducing valve device 297; that the manual controller device 16 at the engine is in its "Stop" position blanking off the pipe 212 and one branch of the pipe 130, venting the pipes 167 and 163 to atmosphere, and connecting the other branch of the pipe 130 to the pipe 96, and holding the fuel control shaft 3 in its "Fuel off" position by the stop rod linkage 17; assume further that the engine is stopped after having previously operated in its ahead direction; and that the lever 320 of the operator's control device 22 in the pilot house is in its "Stop" position, so that the ahead, astern, start, and speed control pipes 242, 243, 245 and 319, respectively, are all vented to atmosphere.

With the low pressure supply pipe 252 charged with fluid under pressure, the chamber 302 in the stop rod breaking cylinder device 44 will be so charged. It will be seen from previous description, therefore, that stop rod linkage 17' will be broken, allowing full freedom of movement of the fuel control shaft 3 between its "Full fuel" and "Fuel off" positions.

With the engine stopped after previous operation in the ahead direction, the cam shaft cylinder device 10 will be in the position in which it is shown in the drawing, with the ahead cam shift piston 70 and rack 11 in their lowermost position and the astern cam shift piston 71 and rack 12 in their uppermost position. The cam shift gear 2 will be in its ahead position to render the forward cams on the engine effective to operate the engine valve or timing gear for operation of the engine in the ahead direction. With the rack 11 in its lowermost position, the follower 183 of the astern cam shift interlock device 21 will be in engagement with the flat portion of cam surface 184 on said rack. The device 21 is therefore conditioned to connect the pipe 195 to the vented astern control pipe 243. With the rack 12 in its uppermost position, the follower 183 of the ahead cam shift interlock device 20 will be disposed in the recess 185 of the cam surface on said rack. The device 20, it will be seen from previous description is therefore conditioned to connect the pipe 192 to atmosphere by way of the port 187. With both of the pipes 192 and 195 both connected to atmosphere at this time via the devices 20 and 21, the respective control chambers in the relay valve devices 18 and 19 are vented to atmosphere. The relay valve devices 18 and 19 are therefore conditioned to establish their respective communications 118. The chamber 72 in the cam shift cylinder device 10 is therefore vented to atmosphere by way of the pipe 162, the communication 118 in the relay valve device 18, the pipe 163 and the device 16. The chamber 73 in the cam shift cylinder device 10 is at this time vented to atmosphere by way of the pipe 166, the communication 118 in the astern relay valve device 19, the pipe 167 and the device 16. Both inlet openings to the double check valve device 36 will be open to atmosphere via the pipes 192 and 195 so that the pipe 210 connected to the outlet opening of said double check valve device 36 will also be so vented. With the pipe 210 vented to atmosphere, the chamber 103 in the stop interlock device 34 and the inlet opening 208 in the double check valve device 40, and the control chamber 102 in the brake relay valve device 26 will be so vented. With fluid under pressure thus vented from its control chamber, the brake relay valve device 26 will establish its communication 118 connecting the pipe 212 to the plugged pipe 211.

With both the ahead and astern control pipes 242 and 243 vented to atmosphere, the pipe 273 will be so vented by way of the double check valve device 35. The vented pipe 273 vents the chamber 103 in the decompression relay valve device 41 and the control chamber 102 in the stop interlock device 34 to atmosphere. With its control chamber 102 vented to atmosphere, the stop interlock device 34 establishes its communication 118 connecting the low pressure supply pipe 252 to the pipe 270 which therefore will be charged with fluid under pressure, as consequently will be the pipe 275 by way of the double check valve device 37, the pipe 247 by way of the double check valve device 38, and the pipe 276 by way of the double check valve device 39.

With the pipe 276 thus charged with fluid under pressure, the chamber 87 in the fuel cut-off cylinder device 14 will be so charged, with the result that fuel cut-off piston 86 will be in its extreme position opposite to that in which it is shown in the drawing, with the rod 90 in engagement with the fuel control lever 4 holding it in its "Fuel off" position.

With the pipe 247 thus charged with fluid under pressure as described above, the start interlock device will be conditioned to establish its communication 119 connecting the now vented start control pipe 245 to the pipe 240 which therefore will be vented by way of said start control pipe.

With the pipe 240 thus vented, the respective control chambers 102 in the start relay valve device 27 and ventilating relay valve device 132 will be vented, as also will be the chamber 222 in the fuel limit cylinder device 28 and the connection of said pipe 240 with the directional interlock device 30.

With its control chamber thus vented, the start relay valve device 27 will be conditioned to establish its communication 118 to connect the pipe 216 to atmosphere by way of the pipe 215.

With its control chamber vented, the ventilating relay valve device 132 will be conditioned to reestablish its communication 118 connecting the pipe 96, hence the pipe 130 via the device 16, to atmosphere by way of the pipe 311. With the pipe 130 thus vented, the starting air valves (not shown) on the engine will be so conditioned as to prevent supply of starting air to said engine at this time.

With the chamber 222 in the fuel limit cylinder device 28 vented to atmosphere at this time, the rod 225 will be in its rest position such as will not interfere with full movement of the fuel control lever 4.

With the pipe 240 vented, the directional interlock device 30 will be so conditioned that its shoe 241 will be disposed away from the engine crank shaft 1, and since the engine was last operated in its ahead direction, the valve mechanism (not shown) in said directional interlock device will be positioned to connect the pipe 244 to the now vented astern control pipe 243. The pipe 244 and inlet opening 208 to the double check valve device 37 therefore, at this time also will be vented.

With the fuel control lever 4 in its "Fuel off" position, the recessed portion of the cam 265 will be presented to the stem 264 so that the speed interlock device 33 is conditioned to connect the pipe 254, hence inlet opening 207 in the double check valve device 38, to atmosphere.

Since the engine is stopped, the lubricating oil pressure will be zero and the engine oil pressure interlock device 15 will be positioned to establish its communication 118 venting the pipe 212 to atmosphere via the pipe 119b and the choke 119c. With the pipe 212 thus vented to atmosphere, the brake 13 will be released.

With the speed control pipe 319 vented to atmosphere, the piston 315 in the speed control cylinder device 23 will be in the position in which it is shown in the drawing for holding a minimum initial tension on the spring 65 corresponding to the idling speed setting of the governor device 5.

Now let it be assumed that the operator desires to start the engine for operation in the same, or ahead, direction in which it last operated, as determined by position of the cam shift gear 2.

The operator will then move the control lever 320 in the operator's control device 22 in the pilot house from its "Stop" position to its "Ahead" "Start" position in the slot 322. This movement of the handle 320 will effect a supply of fluid under pressure to the ahead control pipe 242 and to the start control pipe 245, while maintaining the astern control pipe 243 and the speed control pipe 319 vented to atmosphere.

Since the cam shift gear 2 is already in its ahead position, the cam shift interlock devices 20 and 21 will remain positioned as aforedescribed. The now charged ahead control pipe 242 will remain disconnected from the pipe 192 which remains open to atmosphere via the unseated valve 177 and port 187 in the device 20. The pipe 195 will remain connected to the vented astern control pipe 243 by way of the unseated valve 176 in the device 21. With the pipes 192 and 195 thus vented to atmosphere, the ahead and astern relay valve devices 18 and 19 remain positioned as before connecting the pipes 162 and 166, hence chambers 72 and 73 in the cam shift cylinder device 10, to atmosphere. Pistons 70 and 71 in the shift cylinder device 10 remain static, as therefore does the cam shift gear 2.

Since the pipes 192 and 195 remain vented to atmosphere at this time, the chamber 103 in the stop interlock device 34 and the inlet opening 208 in the double check valve device 40 will also remain vented via the pipe 210 and the double check valve device 36.

Since the directional interlock device 30 is already in its ahead position, the pipe 244 and hence the inlet opening 208 in the double check valve device 37 will remain open to the atmosphere by way of the vented astern control pipe 243.

At the time that the ahead control pipe 242 is charged with fluid under pressure, such fluid under pressure will flow via the double check valve device 35 into the pipe 273 to the control chamber 102 in the stop interlock device 34 and to the chamber 103 in the decompression relay valve device 41 for reasons which will hereinafter be described.

Upon supply of fluid under pressure to its control chamber, the stop interlock device 34 will respond to establish its communication 119 connecting the pipes 270 to atmosphere by way of the pipe 271.

With the pipes 270, 244, 212 and 254 now vented to atmosphere, fluid under pressure will flow from the chamber 87 in the full cut-off cylinder device 14 by way of the pipe 276, double check valve device 39, pipe 275 and double check valve device 37, thus allowing the piston 86 and rod 90 to assume the position in which they are shown in the drawing out of engagement with the fuel control lever 4 which will move under the influence of spring 65 to its "Fuel limit" position as defined by engagement of arm 226 with the rod 225 which will be in its extended position as will be described subsequently.

At the same time that the fuel control lever 4 thus assumes its "Fuel limit" position, the cam 265 presents its raised portion 265a to the stem 264, thereby conditioning the device 33 to effect supply of fluid under pressure from the low pressure supply pipe 252 to the pipe 254, whereupon fluid under pressure will flow via said pipe 254 to the inlet opening 207 of the double check valve device 38 to maintain the pipe 247 charged with fluid under pressure, so that the start interlock device 31 maintains its communication 119 established connecting the now charged start control pipe 245 to the pipe 240.

Substantially at the same time that the above is occuring, and when the start control pipe 245 is charged initially, fluid under pressure will flow via the start interlock device 31 into the pipe 240 to the directional interlock device 30 to cause engagement of shoe 241 with the shaft 1, to the chamber 222 to cause movement of the fuel limit rod 225 to its extended position, to the control chamber in the ventilating relay valve device 132 to cause same to connect the pipe 96 to the plugged pipe 310 to prevent leakage of fluid under pressure from the pipe 130, and to the control chamber in the start relay valve device 27 to cause same to effect supply of fluid under pressure from the supply pipe 153 to the pipe 216 thence to the pipe 130 by way of the check valve device 217 by establishment of communication 119 in said device 27.

Upon supply of fluid under pressure to the pipe 130, the starting air valve devices (not shown) on the engine will respond to effect supply of starting air to the engine which will thus be turned over in its ahead direction with fuel being supplied at the same time.

When the engine is thus turned over on starting air the lubricating oil pressure will be built up, and this pressure in the control chamber of the oil pressure interlock device 15 will cause said device to disestablish its communication 118 connecting the pipe 212 to atmosphere via pipe 119b and choke 119c, and to establish its communication 119 to connect said pipe 212 to the plugged pipe 119d.

While the engine is thus being turned over on starting air in its ahead direction, and with the fuel control lever 4 in its "Fuel limit" position, fuel is being supplied to the engine in a limited amount, somewhat less than the maximum amount corresponding to "Full fuel," along with the supply of starting air. Such fuel will fire and cause running of the engine at increasing speed above that at which it was turning over on starting air alone, at which time the speed governor device 5 will take control and adjust the position of the fuel control lever 4, moving same from "Fuel limit" position to "Idling fuel" position, to correspond with the speed setting of said governor device. It should be pointed out that the initial supply of fuel to the engine in starting is limited to less than full fuel to prevent initial racing of the engine when such fuel fires and before the governor device responds to reduce such supply to an amount commensurate with idling operation of the engine.

Substantially at the time that the fuel control lever 4 is caused to assume its "Idling fuel" position, the raised portion 265a of the cam 265 will leave the stem 264 of the device 33, with the recessed portion 265b of said cam presented thereto. The device 33, as will be appreciated from previous description, will thereby become effective to cut off the pipe 254 from the supply pipe 252 and to vent said pipe 254 to the atmosphere, whereupon, with the pipe 275 also so vented, the pipe 247 will vent to the atmosphere by way of the double check valve device 38.

With the pipe 247 thus vented, the start interlock device 31 will respond to disestablish its communication 119, thus disconnecting the start control pipe 245 from the pipe 240, and to establish its communication 118, thereby connecting said pipe 240 to atmosphere by way of the pipe 246.

With the pipe 240 thus vented to atmosphere, the shoe 241 of the directional interlock device 30 will be caused to move to its retracted rest position in which it is shown in the drawing, while the valve mechanism in said device will remain adjusted as before for operation of the engine in its ahead direction, maintaining connection between the pipe 244 and the now vented astern control pipe 243. At the same time, the chamber 222 in the fuel limit cylinder device 28 will vent to the atmosphere by way of the pipe 240, so that the piston 221 and rod 225 will be returned to their rest position in which they are shown in the drawing to allow the fuel control lever 4, which is yet in its "Idling fuel" position, full freedom of movement in the direction of "Full fuel." The control chamber in the start relay valve device 27 will vent to atmosphere by way of the now vented pipe 240. The device 27 will then respond to disestablish its communication 119 and to establish its communication 118 to cut off supply of fluid under pressure from pipe 153 to pipe 216 and to open the latter pipe to atmosphere via the pipe 215. The pipe 130 will not vent to atmosphere by way of the pipe 216, as the check valve device 217 will prevent such from occurring. At the same time, the control chamber in the ventilating relay valve device 132 will vent to atmosphere with the pipe 240, and such device will respond to disestablish its communication 119, thus disconnecting the pipe 96 from the plugged pipe 310, and to establish its communication 118, thereby venting said pipe 96, hence the pipe 130 via device 16, to atmosphere by way of the pipe 311. With the pipe 130 vented to atmosphere, the starting air valve mechanism on the engine will respond to terminate supply of starting air to said engine which will continue to run on fuel.

With the engine thus running on fuel and with the starting air automatically cut off, the operator may then move the lever 320 out of its "Ahead" "Start" position in the slot 322 to "Ahead" "Run idle" position in the slot 321, thereby effecting venting of the start control pipe 245 to atmosphere while the speed, ahead, and astern control pipes 319, 242 and 243, respectively, remain conditioned as in the "Ahead" "Start" position.

The operator may now increase the speed of operation of the engine while thus running on fuel in its ahead direction by moving the lever 320 in the slot 321 out of "Ahead" "Run idle" in the direction of "Ahead" "Full speed" to effect increase in pressure in the speed control pipe 319 and through the speed control cylinder device 23 thereby increase the speed setting of the governor device 5.

The governor device 5 will then respond to effect movement of the fuel control lever 4 out of its "Idling fuel" position toward its "Full fuel" position in accord with the speed setting of said device. Fuel supply to the engine will thus be increased in accord with position of the fuel control lever 4 and said engine will increase in speed, as desired.

When the fuel control lever 4 is thus caused to leave its "Idling fuel" position to assume a position or positions in the direction of its "Full fuel" position, the raised portion 265a of the cam 265 will again be presented to the stem 264 of the device 33. The device 33 will again respond to connect the pipe 254 to the supply pipe 252, whereupon, fluid under pressure from the latter pipe will flow into the former pipe, and, by way of the double check valve device 38 and the pipe 247, will flow into the control chamber in the start interlock device 31. The start interlock device 31 will respond upon supply of fluid under pressure to its control chamber to disestablish its communication 118 and reestablish its communication 119 to again connect the start control pipe 245 to the pipe 240. Since, however, the start control pipe 245 is vented to atmosphere at this time at the operator's control device 22, the pipe 240 remains so vented and the status of devices 27, 132, 28 and 30 remains the same.

From the above description it will be noted that restarting the engine in the last (ahead) direction of operation consists essentially of supplying fluid under pressure to the control chamber in the stop interlock device 34, by way of the ahead control pipe 242, to cause release of fluid under pressure from the fuel cut-off cylinder device 14 by way of the pipe 276, double check valve device 39, pipe 275, double check valve device 37, pipe 270 and said device 34; supplying fluid under pressure to the pipe 240 by way of the start control pipe 245 to cause the directional interlock device 30 to operate, to cause the fuel limit cylinder device 28 to operate to limit fuel supply to the engine during starting, to cause the ventilating relay valve device 132 to operate to close off the pipe 130 to atmosphere, and to cause the start relay valve device 27 to operate to effect supply of fluid under pressure to the pipe 130 and thence to the starting air valve mechanism on the engine to effect supply of starting air to said engine for turning same over in its ahead or last direction of operation. The start interlock device 31 maintains the now charged start control pipe 245 connected to the pipe 249 at this time even though the pipe 270 is vented, since the device 33 will effect supply of fluid under pressure to the control chamber of said device 31 via pipe 254, double check valve device 38 and pipe 247 when the fuel control lever 4 moves to "Fuel limit" position after release of the fuel cut-off cylinder device 14.

Fuel and starting air are thus simultaneously supplied to the engine, which will turn over in its ahead direction in accord with position of the cam shift gear 2. When the fuel fires and the engine begins to run on same, the governor device 5 will take over and move the fuel control lever 4 back to its "Idling fuel" position in accord with the speed setting of said governor device. Upon obtaining "Idling fuel" position with the fuel control lever 4, the cam 265 causes the device 33 to vent the pipe 254, hence the pipe 247, to atmosphere, whereupon the device 31 responds to also so vent the pipe 240. With the pipe 240 vented, the fuel limit cylinder device assumes its rest position to allow for full range movement of the fuel control lever 4, the start relay valve device 27 disconnects the pipe 130 from the supply pipe 153, and the ventilating relay valve device 132 causes venting of the pipe 130 to atmosphere to in turn cause termination of supply of starting air to the engine. With the starting air thus cut off automatically when the engine starts to run on fuel, the speed of said engine may then be regulated as desired.

When the operator desires to stop the engine, he will move the lever 320 to its "Stop" position for releasing fluid under the pressure from the ahead control pipe 242 and speed control pipe 319, along with the astern and start control pipes 243 and 245.

Release of fluid under pressure from the speed control pipe 319 will allow the speed control cylinder device 23 to set the governor device 5 for idling speed.

Release of fluid under pressure from the ahead control pipe 242 along the astern control pipe 243, will allow fluid under pressure to release from the control chamber in the stop interlock device 34 by way of the pipe 273 and the double check valve device 35. The device 34 will then respond to establish its communication 118 and thereby effect supply of fluid under pressure from the pipe 252 to the pipe 270, thence to the pipe 275 via double check valve device 37, thence to the pipes 247 and 276 via double check valve devices 38 and 39, respectively.

Fluid under pressure thus supplied to the pipe 247 will cause the device 31 to maintain the pipe 249 connected to the now vented start control pipe 245 so that the status of devices 27, 132, 28 and 30 will not change at this time.

Fluid under pressure supplied to the pipe 276 will flow to the fuel cut-off cylinder device 14 to cause same to move the fuel control lever 4 to its "Fuel off" position, thereby effecting termination of supply of fuel to the engine to allow same to come to a stop.

In coming to a stop from operation of the engine in one direction by movement of lever 320 to "Stop" position, the brake 13 will not be applied and the engine will coast to a stop since the pipe 210 remains vented to the atmosphere via the double check valve device 36 and pipes 192 and 195 and the brake relay valve device 26 maintains the supply pipe 153 cut off from the pipe 212.

If, however, the operator desires to stop the engine rapidly while operating ahead, he may move the lever 320 in the groove 321 from its position at the "Ahead" side of "Stop" position to any position in said groove at the "Astern" side of "Stop" position. In so doing, the ahead and speed control pipes 242, 319 are vented and the astern control pipe 243 is charged, while the start control pipe 245 remains vented.

In response to charging the astern control pipe 243, fluid under pressure will flow therefrom via the unseated valve 176 in astern cam shift interlock device 21 to the pipe 195, whence it will flow via the double check valve device 36 and pipe 210 to the control chamber in the brake relay valve device 26 to cause fluid under pressure to be supplied from pipe 153 to the pipe 212 to the brake cylinder chamber 77 to apply the brake 13 for effecting sudden stopping of the engine. At the same time, the directional interlock device 30 being set for ahead operation of the engine, fluid under pressure from the charged astern control pipe 243 will flow via said device 30 to the pipe 244, and via double check valve device 37, pipe 275, double check valve device 39 and pipe 276 to the chamber 87 in the fuel cut-off cylinder device 14 to cause the fuel control lever 4 to be moved to its "Fuel off" position for cutting off supply of fuel to the engine to allow for stopping same. Such coincidental operations as may occur at this time to prepare the engine for reversal have been omitted from the description, and only those details necessary to explain how a rapid stop may be effected by movement of lever 320 from "Ahead" to "Astern" side of "Stop" in slot 321 have been included.

When the engine comes to a stop, the oil pressure interlock device 15 will again reflect the drop in lubricating oil pressure to connect the pipe 212 to atmosphere by way of the pipe 119b and choke 119c, thereby automatically releasing the brake 13.

With the control lever 320 in "Stop" position and the engine stopped in a conventional manner after operation in its ahead direction, the apparatus will be conditioned as previously described, that is, with the ahead, astern, speed and start control pipes 242, 243, 319 and 245, respectively, all vented to the atmosphere. The cam shift gear 2 will be in its ahead position, as will be the cam shift cylinder device 10. The ahead cam shift interlock device 20 will be conditioned to connect the pipe 192 to atmosphere via its port 187, and the astern cam shift interlock device 21 will be conditioned to connect the now vented astern control pipe 243 to the pipe 195. The ahead relay valve device 18 will be conditioned, with pipe 192 vented, to vent the pipe 162 to atmosphere via pipe 163, and the astern relay valve device 19 will be conditioned, with pipe 195 vented, to vent the pipe 166 to atmosphere via pipe 167. The chambers 72 and 73 in the cam shift cylinder device 10 therefore are both vented at this time. With both pipes 192 and 195 vented, the pipe 210 will also be vented by way of the double check valve device 36. With the pipe 210 vented, the brake relay valve device 26 will be positioned to maintain supply of fluid under pressure from the pipe 153 cut off from the pipe 212, hence from the brake cylinder chamber 77. After the engine has come to a stop, the oil pressure interlock device 15 will effect venting of the pipe 212 to atmosphere by way of the pipe 119b and choke 119c. With the pipe 212 thus vented, one inlet opening of each of the double check valve devices 39 and 40 will be so vented as well as will be the pipe 213 and thereby the chamber 103 in the start interlock device 31. With both the ahead and astern control pipes 242 and 243 vented to atmosphere, the pipe 273 and hence the control chamber in the stop interlock device 34 will be so vented by way of the double check valve device 35, so that said device 34 will connect the pipe 270 to the supply pipe 252 via its communication 118. The pipe 270 is therefore charged with fluid under pressure, as consequently will be the pipe 275, by way of the double check valve device 37, the pipe 276, by way of the double check valve device 39, and the pipe 247, by way of the double check valve device 38. With the pipe 276 charged, the fuel cut-off cylinder device 14 will be positioned to hold the fuel control lever 4 in its "Fuel off" position. With the pipe 247 charged, and the pipe 213 vented, the start interlock device 31 will be positioned to establish its communication 119 connecting the now vented start control pipe 245 to the pipe 240 which therefore is also vented at this time. With the pipe 240 vented, the start relay valve device 27 is conditioned to establish its communication 118 connecting the pipe 216 to atmosphere; the ventilating relay valve device 132 is conditioned to establish its communication 118 also, connecting the pipe 96, hence pipe 130, to atmosphere; the fuel limit cylinder device 28 is in its rest position as is also the directional interlock device 30. With both of the pipes 210 and 212 vented to atmosphere, the chamber 229 connected to the outlet opening of the double check valve device 40 also will be so vented, so that the latch element 231 will be in locked engagement with the rack 11, as will be appreciated from previous description. The cam 265 will be so positioned, with the fuel control lever 4 in its "Fuel off" position as to present its recess 265b to the stem 264, so that the device 33 will vent the pipe 254 to atmosphere.

Now let it be assumed that, with the engine stopped after previous operation in its ahead direction with the cam shift gear 2 set for operation in such direction, the operator desires to start the engine operating in the reverse or astern direction. To accomplish this, the operator will move the lever 320 to the "Astern" "Start" position in the slot 323 to effect supply of fluid under pressure to the astern control pipe 243 and to the start control pipe 245 while maintaining the ahead and speed control pipes 242 and 319 vented to atmosphere.

Upon supply of fluid under pressure to the astern control pipe 243, same will flow by way of the unseated valve in the cam shift interlock device 21 to the pipe 195. Fluid under pressure thus supplied to the pipe 195 will flow via check valve device 194 to the control chamber of the astern relay valve device 19, and by way of the double check valve device 36 to the pipe 210.

In response to supply of fluid under pressure to its control chamber, the astern relay valve device 19 will establish its communication 119 connecting the supply pipe 153 to the pipe 166, whereupon fluid under pressure will flow to the chamber 73 in the cam shift cylinder device 10.

At the same time, fluid under pressure supplied to the pipe 210 will flow to the chamber 103 in the stop interlock device 34 to hold same in its former position establishing its communication 118 while its control chamber 102 becomes charged with fluid under pressure from the astern control pipe via double check valve device 35 and the pipe 273. Also, fluid under pressure supplied to the pipe 210 will flow to the control chamber in the brake relay valve device 26 which will respond thereto to establish its communication 119 connecting the pipe 212 to the high pressure supply pipe 153. Fluid under pressure will then flow from pipe 153 via device 26 into the pipe 212, thence to the brake cylinder chamber 77 to apply the brake 13, via reducing valve device 214 and pipe 213 to the chamber 103 in the interlock device 31 to prevent it from operating at this time to supply fluid under pressure to the pipe 240, to the chamber 229 in the cam shift unlocking cylinder device 227 by way of the double check valve device 40 and to chamber 87 in the fuel cut-off device 14 to maintain the fuel shaft 3 in the fuel cut-off position. The unlocking cylinder device 227 will respond to pressure of fluid supplied thereto to move latch element 231 out of locking engagement with the rack 11, allowing fluid under pressure in the chamber 73 in the cam shift cylinder device 10 to move the piston 71 and rack 12 from the position in which they are shown in the drawing to their opposite extreme position, turning the cam shift gear 2 to its astern position during such movement. At the same time, through the turning movement of the gear 2, the rack 11 and piston 70 are caused to move to their uppermost position as viewed in the drawing. The engine valve cam and timing mechanism will now be so conditioned upon attainment of the cam shift gear 2 to its astern position as to properly condition the engine for operation in its astern direction. During shifting of the racks 11 and 12 to effect shifting of the gear 2 from its ahead to its astern position, the groove or recess 185 in rack 11 will be presented to the follower 183 of the astern cam shift interlock device 21, allowing its stem 181 to move outwardly of the casing and its valves 176 and 177 to close and open respectively. At the same time, movement of the rack 12 will cause the roller 183 of the ahead cam shift interlock device 20 to leave the recess or groove 185 in said rack and follow its flat surface portion, and through displacement of the respective stem 181 to seat the valve 177 and and unseat the valve 176 in said device 20.

The respective roller follower 183 of the device 20 leaves the recess 185 in the rack 12 immediately upon initial movement of said rack, the status of said device therefore changes immediately and disconnects the pipe 192 from the respective port 187 to atmosphere and connects said pipe 192 to the now vented ahead control pipe 242, the status of pipe 192 remaining the same at this time. The status of the astern cam shift interlock device 21 is not changed until the rack 11 attains its new position, and shift of the gear 2 is complete, at which time the pipe 195 is disconnected from the now charged astern control pipe 243 and said pipe 195 is connected to atmosphere via the respective port 187.

When the pipe 195 is thus vented to atmosphere, with the pipe 192 already so vented, fluid under pressure will be released from the control chamber in the astern relay valve device 19 by way of the choke 193, and from the pipe 210 by way of the double check valve device 36.

Upon venting of fluid under pressure from its control chamber, the astern relay valve device 19 will establish its communication 118 connecting the pipe 166 to the pipe 167, whereupon fluid under pressure from the chamber 73 in the cam shift cylinder device 10 will flow to atmosphere via pipe 166, device 19, pipe 167, and the device 16.

At the same time, with the pipe 210 vented, fluid under pressure will release from the control chamber in the brake relay valve device 26 and from the chamber 103 in the stop interlock device 34.

Upon release of fluid under pressure from the control chamber in the brake relay valve device 26, same will respond to establish its communication 118 connecting the pipe 212 to the plugged pipe 211, whereupon fluid under pressure in said pipe 212 will slowly vent to atmosphere by way of the choke 119c in the oil pressure interlock device 15, thereby releasing the brake 13 and venting fluid under pressure from the chamber 103 in the start interlock device 31. With both the pipes 210 and 212 now vented to atmosphere, fluid under pressure in the chamber 229 in the cam shift unlocking cylinder device 227 will release to atmosphere via double check valve device 40 to allow the spring 230 in said device 227 to move the latch element 231 into locking engagement with the rack 11 in a recess 236.

Upon venting of the chamber 103 in the stop interlock device 34, the pressure of fluid in its control chamber will become effective to establish the communication 119, venting the pipe 270 to atmosphere by way of the pipe 271. Since the pipe 244 is charged at this time however, the pipes 275, 276 and 247 will remain pressurized.

With the pipe 247 pressurized at the time that fluid under pressure is vented from the chamber 103 in the start interlock device 31, said device will respond to establish its communication 119 connecting the now charged start control pipe 245 to the pipe 240, whereupon fluid under pressure will flow from the former pipe into the latter pipe.

With the pipe 240 thus supplied with fluid under pressure such fluid under pressure will flow to the directional interlock device 30 and cause same to move its shoe 241 into engagement with the shaft 1; it will flow to the chamber 222 in the fuel limit cylinder device 28 to cause the rod 225 to assume its extended position for limiting movement of the fuel control lever 4 in the direction of its "Full fuel" position; it will flow to the control chamber in the ventilating valve device 132 to cause same to establish its communication 119 connecting the pipe 96 to the plugged pipe 310; and it will flow to the control chamber in the start relay valve device 27 which will respond thereto to establish its communication 119 connecting the pipe 216 to the supply pipe 153, whereupon fluid under pressure will flow from the latter pipe into the former pipe and via check valve 217 into the pipe 130 to the starting air valve mechanism on the engine which will respond thereto to effect supply of starting air to turn said engine over in its astern direction.

Upon initial turning over of the engine in its astern direction, through engagement of the shoe 241 with the shaft 1 the directional interlock device 30 will assume its astern position and will disconnect the pipe 244 from the charged astern control pipe 243 and connect said pipe 244 to the now vented ahead control pipe 242 which pipe 244 therefore also becomes so vented.

Since the pipe 270 is already vented to the atmosphere via device 34 at the time that the pipe 244 becomes vented via the directional interlock device 30 as above, fluid under pressure from the chamber 87 in the fuel cut-off cylinder device 14 will release to atmosphere by way of the pipe 276, double check valve device 39, pipe 275, and double check valve device 37. The fuel cut-off piston 86 and rod 90 then will assume their rest position to allow the spring 65 to move the fuel control lever 4 to its "Fuel limit" position to effect supply of a limited amount of fuel to the engine along with the starting air. The cam 265 in moving with the fuel control lever 4 will cause depression of the stem 264, whereupon the device 33 will effect supply of fluid under pressure to the pipe 254 and will maintain the pipe 247 pressurized via double check valve device 38 even though the pipe 275 may be vented. With the pipe 247 maintained pressurized, the device 31 persists to maintain its communication 119 established, thus maintaining connection between the charged start control pipe 245 and the pipe 240.

When the fuel fires, the engine will start to run at speeds faster than the speed at which it was being turned over on starting air alone, and the speed governor device 5 will take over and move the fuel control lever back to its "Idling fuel" position to limit the speed thereof in accord with the idling speed setting of said device.

While the lever 320 is yet in its "Astern" "Start" position, the cam 265 in moving with the fuel control lever 4, upon its movement to "Idling fuel" position as above, will present its recessed portion to the stem 264, thus conditioning the device 33 to vent the pipe 254 to atmosphere. Since the pipe 275 is already vented to atmosphere when the pipe 254 becomes so vented via device 33, fluid under pressure in the control chamber of the start interlock device 31 will release to atmosphere by way of the pipe 247 and the double check valve device 38.

Since at the time that fluid under pressure is thus vented from the control chamber of the start interlock device 31 its chamber 103 is also vented, said device will respond to establish its communication 118 connecting the pipe 240 to atmosphere by way of the pipe 246. With the pipe 240 thereby connected to atmosphere, the shoe 241 in the directional interlock device 30 will move away from the shaft 1 to a retracted rest position in which it is shown in the drawing while said device 30 maintains connection between the pipe 244 and the now vented ahead control pipe 242; fluid under pressure will release from the chamber 222 in the fuel limit cylinder device 28 to allow the piston 221 and rod 225 to assume their rest position in which they are shown in the drawing to allow freedom for full range movement of the fuel control lever 4 which is in its "Idling fuel" position at this time; fluid under pressure will release from the control chamber of the start relay valve device 27, which will respond thereto to disestablish its communication 119, thus disconnecting the pipe 216 from the supply pipe 153 and to establish its communication 118 connecting said pipe 216 to atmosphere, the check valve 217 prevents release of fluid under pressure from pipe 130 via pipe 216; fluid under pressure also will release from the control chamber in the ventilating relay valve device 132 which will respond thereto to disestablish its communication 119 and establish its communication 118 for connecting the pipe 96, hence pipe 130, to atmosphere via pipe 311 to allow for release of fluid under pressure from the starting air valve mechanism on the engine, which mechanism will respond to such release of fluid under pressure from the pipes 130 to terminate supply of starting air to the engine which will continue to run on fuel.

Thus it will be seen that in moving lever 320 from "Stop" to "Astern" "Start" position after previous operation of the engine ahead, the following operations are automatically effected in sequential order while the lever remains in the last named position; fluid under pressure is supplied to the brake cylinder 75 for applying the brake 13, to the unlocking cylinder 227 to unlock the racks 11 and 12, and to the cam shift cylinder device 10 to cause shifting of the gear 2 from its ahead to its astern position while the fuel cut-off cylinder device maintains the fuel control lever 4 positioned as during "Stop" to hold the fuel supply cut off to the engine; at the time that the cam shift gear 2 has attained its astern position to condition the engine for operation in the astern direction, fluid under pressure will be released from the brake cylinder device 75 and from the unlocking cylinder 227 to release the brake 13 and to lock the gear 2 in its astern position while at substantially the same time starting air is supplied to the engine to turn same over in its astern direction. Upon initial turning movement of the engine in its new or astern direction the fuel cut-off cylinder device 14 is released to allow fuel to be supplied to the engine along with the starting air; when the fuel fires and starts to run the engine, supply of starting air is automatically cut off to the engine which continues to run on fuel at its idling speed.

With the engine thus running on fuel in its astern direction at idling speed with supply of starting air having been cut off automatically, the operator may move the lever 320 out of "Astern" "Start" position in slot 323 to "Astern" "Run idle" in slot 321, venting the start control pipe 245 along with the ahead and speed control pipes 242 and 319, while maintaining the astern control pipe 243 charged with fluid under pressure. The operator may then adjust position of the lever 320 between "Astern" "Run idle" and "Astern" "Full speed" positions to effect variation in pressure of fluid in the speed control pipe 319 and, through speed control cylinder device 23, effect variation in the speed setting of the governor device 5 for regulating engine speed accordingly, as will be appreciated from previous description.

Again, when the fuel control lever 4 is moved out of its "Idling fuel" position in the direction of "Full fuel" position, the cam 265 in moving with said lever will cause stem 264 to be depressed, so that device 33 will effect supply of fluid under pressure to the control chamber in the start interlock device 31 by way of the pipe 254, double check valve device 38, and the pipe 247. The start interlock device 31 will then respond to disconnect the pipe 240 from the pipe 246 to atmosphere and to connect said pipe 240 to the start control pipe 245. Since the start control pipe 245 is vented to atmosphere at this time, the status of the pipe 240 does not change so that the devices 27, 132, 28 and 30 are not influenced at this time by such operation of the device 33 and supply of starting air to the engine will remain cut off while said engine is running on fuel.

Again when the operator desires to terminate operation of the engine, he may move the operator's lever 320 to "Stop" position to vent the astern and speed control pipes 243 and 319 to atmosphere along with the ahead and start control pipes 242 and 245.

Upon venting of fluid under pressure from the speed control pipe 319, the piston 315 in the speed control cylinder device 23 will be caused to assume its rest position in which it is shown in the drawing to set the governor device 5 for idling speed of the engine. At the same time, upon venting the astern control pipe 243 to atmosphere, fluid under pressure will release from the control chamber in the stop interlock device 34 by way of the pipe 273 and the double check valve device 35. The device 34 will then respond to disestablish its communication 119 connecting the pipe 270 to atmosphere and to establish its communication 118 to effect supply of fluid under pressure from the pipe 252 to said pipe 270. Fluid under pressure will then flow into the pipe 270 to the chamber 87 in the fuel cut-off cylinder device 14 by way of double check valve device 37, pipe 275, double check valve device 39, and pipe 276 to cause its piston 86 and rod 90 to move the fuel control lever 4 to its "Fuel off" position, thus terminating supply of fuel to the engine which will coast to a stop. At the same time, fluid under pressure in pipe 275 will flow via double check valve device 38 to the control chamber of the start interlock device 31 to maintain the vented start control pipe 245 connected to the pipe 240 while the pipe 254 is vented to atmosphere by device 33 when the fuel control lever 4 is caused to assume its "Fuel off" position. Both of the pipes 192 and 195 will remain vented at this time via the ahead cam shift interlock device 20 and the astern cam shift interlock device 21, respectively, as therefore will the pipe 210 by way of the double check valve device 36. With the pipe 210 vented to atmosphere, the chamber 103 in the stop interlock device 34 will be so vented as well as will be the control chamber in the brake relay valve device 26 which therefore will remain positioned to connect the pipe 212 to the plugged pipe 211, so that the brake 13 is not applied during termination of operation of the engine when lever 320 is moved to its "Stop" position. The cam shift cylinder device 10 will remain static with both of its chambers 72 and 73 vented to atmosphere by way of the relay valve devices 18 and 19, respectively. The cam shift interlock device 20 will be positioned to connect the pipe 192 to the vented ahead control pipe 242, and the cam shift interlock device 21 will be positioned to connect the pipe 195 to atmosphere by way of the respective port 181. All other parts of the apparatus will be positioned as previously described.

As before, if for any reason when operating in one direction, such as the astern direction it is desired to stop the engine quicker than can be accomplished by merely cutting off the fuel supply, the operator may move the lever 320 from its "Astern" position through "Stop" position to any position in slot 321 at the "Ahead" side of "Stop" position, thereby venting the astern control pipe 243 to atmosphere and supplying fluid under pressure to the ahead control pipe 242, while the start control pipe 245 remains vented to the atmosphere. Fluid under pressure will then flow from pipe 242 by way of the directional interlock device 30, which will be in its astern position, the pipe 244, the double check valve device 37, the pipe 275, the double check valve device 39, and the pipe 276 to the chamber 87 in the fuel cut-off cylinder device 14 to move the fuel control lever 4 to "Fuel off" position for cutting off supply of fuel to the engine. At the same time, fluid under pressure from the charged ahead pipe will flow by way of the unseated valve 176 in the ahead cam shift interlock device 20 to the pipe 192, and thence by way of the double check valve device 36 and the pipe 210 to the brake relay valve device 26. The brake relay valve device 26 will then respond to establish its communication 119 connecting the supply pipe 153 to the pipe 212. Fluid under pressure will then flow from the pipe 153 into and through the pipe 212 to the brake cylinder chamber 77 in the brake cylinder chamber 77 to cause an application of the brake 13 for rapid deceleration of the engine. Once the engine has thus been brought to a quick stop, the oil pressure interlock device 15 will operate to establish its communication 118 connecting the pipe 212 to atmosphere by way of choke 119c to release the brake 13. At the same time, fluid under pressure supplied to pipe 192 via device 20 will flow to the control chamber of device 18 and cause same to effect supply of fluid under pressure to the chamber 72 in the cam shift cylinder device 10 for shifting gear 2 to its ahead position while the unlocking cylinder 227 is operative to allow for such shifting by virtue of supply of fluid under pressure from the pipe 210 via the double check valve device 40. Once such shift of the gear 2 has been effected, the devices 20 and 21 will again be caused to assume the positions in which they are shown in the drawing, with the now charged ahead control pipe 242 disconnected from the pipe 192 which will then be vented via port 187 in said device 20, while the pipe 195 will be connected via device 21 to the now vented astern control pipe 243. With both of the pipes 192 and 195 vented to atmosphere, the relay valve device 18 will again vent pipe 162 and chamber 72 in the cam shift cylinder device 10 to atmosphere, the brake relay valve device 26 will respond to cut off supply of fluid under pressure to the pipe 212, and fluid under pressure will release from the chamber 103 in the device 34. Fluid under pressure in the brake cylinder chamber 77 and pipe 212 will release by way of the choke 119c in device 15, and with both pipes 210 and 212 vented, fluid under pressure in chamber 229 in the unlocking cylinder 237 will release by way of the double check valve device 40 to allow spring 230 to effect locking of the gear 2 in its ahead position. At the same time, release of fluid under pressure from the chamber 103 in the stop interlock device 34 will allow fluid under pressure in its control chamber from the ahead control pipe 242 and pipe 273 to become effective to cause said device 34 to establish its communication 119 venting the pipe 270 to atmosphere. The pipe 244, however, at this time remains charged with fluid under pressure via the directional interlock device 30 so that pipes 275, 276 and 247 also remain charged, as will be appreciated from previous description, to maintain the fuel cut-off cylinder 14 in operation to hold the supply of fuel cut off to the engine, and to hold the start interlock device 31 in its position connecting the vented start control pipe 245 to the pipe 240 which therefore will also be so vented at this time.

The engine thus has been brought to a quick stop from operation in its astern direction. The lever 320 might then be returned to its "Stop" position, if desired, whereupon parts of the apparatus would assume the positions as previously described after previous operation in its ahead direction, for which reason such description will not be repeated herein. However, assuming that at the time that the engine was in operation in its astern direction the operator desired to effect a snap reversal of operation of the engine from operation astern to operation ahead, the operator would then move the lever 320 from its "Astern" position in slot 321 to the "Ahead" side of "Stop" position in said slot 321, as above described in regard to a rapid stop from operation astern, and then move said lever 320 into the "Ahead" "Start" position in slot 322, which will effect supply of fluid under pressure to the start control pipe 245 along with the ahead control pipe 242 with the speed and astern control pipes 319 and 243 vented to atmosphere. It will be understood that the engine will be brought to a quick stop by cutting off supply of fuel and application of the brake 13 in fashion as described above, and for this reason will not be repeated. In addition, however, it should be pointed out, that while the brake is applied and until the engine has come to a stop, the pipe 212 remaining pressurized until vented by the oil pressure interlock device 15, the chamber 103 in the start interlock device 31 will remain charged maintaining its communication 118 to prevent supply of fluid under pressure from the start control pipe to the pipe 240 until the engine has come to a stop. This prevents starting air from being supplied to the engine until same is ready to be turned over in its new direction, therefore preventing use of such starting air for stopping the engine which, in such snap reversal is effected by the brake 13.

With the engine stopped and the brake released with pipe 212 vented via the oil pressure interlock device 15, and the parts of the apparatus in the respective positions assumed as above described in regard to a rapid stop from operation astern, fluid under pressure supplied to the start control pipe 245 will then flow by way of communication 119 in the start interlock device 31 to the pipe 240 to cause the directional interlock device 30 to be brought into its direction sensing operation with its shoe 241 in engagement with the shaft 1; to cause the fuel limit cylinder device 28 to move its rod 225 to its extended position to limit the amount of fuel to be supplied to the engine during starting so that said engine will not over accelerate before the governor device 5 takes over; to cause the ventilating relay valve device 132 to close off the pipe 130 to atmosphere by connecting the pipe 96 to the plugged pipe 310; and to cause the start relay valve device 27 to effect supply of fluid under pressure from the pipe 153 to the pipe 130 via pipe 216 and the check valve 217 to cause the starting air valve mechanism on the engine to supply starting air to turn the engine over in its ahead direction.

Once the engine is thus caused to turn over in its ahead direction, the directional interlock device 30 will respond to disconnect the pipe 244 from the now charged ahead control pipe 242 and connect said pipe 244 to the now vented astern control pipe 243. Since the pipe 270 is also vented at this time, venting of the pipe 244 via the directional interlock device 30 and the astern control pipe 243 will allow fluid under pressure to release from the chamber 87 in the fuel cut-off cylinder device 14 by way of pipe 276, double check valve device 39, pipe 275, and double check valve device 37 to allow the spring 65 to move the fuel control lever 4 to its "Fuel limit" position for supplying fuel to the engine accordingly. The cam 265, in moving with lever 4 to its "Fuel limit" position will cause the device 33 to effect supply of fluid under pressure to the pipe 254 to maintain the control chamber in the device 31 pressurized via double check valve device 38 and pipe 247 so that the pipe 240 will remain connected to the charged start control pipe 245 at this time. The fuel thus supplied to the engine along with the starting air will fire and cause the engine to run at increasing speed above that at which it was turning over on starting air alone. In response to such an increase in engine speed, the speed governor device 5 will take over to effect movement of the fuel control lever 4 back to its "Idling fuel" position to limit the amount of fuel supply to the engine for operation at its idling speed commensurate with the speed setting of the governor device. The cam 265 in moving with the fuel control lever 4 to its "Idling fuel" position will cause the device 33 to vent the pipe 254 to atmosphere, and since the pipe 275 is already so vented at this time, will allow release of fluid under pressure from the control chamber in the start interlock device 31 which will respond to such release to connect the pipe 240 to atmosphere via the pipe 246. With the pipe 240 thus vented, the shoe 241 will retract in the directional interlock device 30 which will continue to maintain its ahead position connecting the pipe 244 to the now vented astern control pipe 243; the rod 225 in the fuel limit cylinder device 28 will be moved to its retracted position to allow for freedom for full range movement of the fuel control lever 4; the start relay valve device 27 will terminate the supply connection between the pipe 216 and the supply pipe 153; and the ventilating relay valve device 132 will establish its communication 118 to vent the pipe 96, hence pipe 130, to atmosphere to render the starting air valve mechanism on the engine responsive to terminate supply of starting air.

The operator may then move the lever 320 out of "Ahead" "Start" into slot 321 to control the speed of the engine and to vent the start control pipe 245 to prevent resupply of starting air when the device 33 reacts to movement of fuel control lever 4 to supply fluid under pressure to the control chamber 102 in the start interlock device 31 as fuel supply to the engine is increased, as will be appreciated from previous description.

Thus it will be seen that in effecting a snap reversal of the engine from operation in one direction to operation in the other, the lever 320 may be moved from its running control position in the slot 321 at one side of "Stop" position to its "Start" position at the opposite side of its "Stop" position. In response to this, the control apparatus will substantially simultaneously cut off the supply of fuel to the engine and apply the brake 13 to bring the engine to a rapid stop, and at the same time effect reversal of the cam shift gear 2 to condition the engine for operation in its reverse direction; after, and not until, the engine is stopped and the cam shift gear 2 is reversed, starting air is supplied to the engine to turn same over in its new direction; upon initial turning over of the engine in the new or proper direction, the directional interlock device 30 will allow the fuel to be supplied to the engine along with the starting air; the fuel will fire and increase speed of the engine, in response to which the device 33 will cause the supply of starting air to be cut off automatically; then the operator may move the control lever 320 back into the slot 321 for regulating the speed of the engine.

A snap reversal of the engine from operation in its ahead direction to operation in its astern direction may be effected in manner similar to the snap reversal aforedescribed, so that description thereof will not be included herein for sake of brevity.

If at any time difficulty should be experienced in urging the engine to turn over upon supply of starting air thereto, the push button valve device 42 may be operated to effect decompression of the engine cylinders to rid them of pressurized combustion gases remaining therein from the time of last shut down. By pressing the button 290 on the valve device 42, the valve 284 therein can be made to seat and the valve 281 to unseat, allowing fluid under pressure from the supply pipe 252 to flow via the pipe 292 to the control chamber 102 in the relay valve device 41. The relay valve device 41, if its chamber 103 is vented as will be pointed out, will then respond to establish its communication 119 to supply fluid under pressure from the high pressure supply pipe 153 to the pipe 279 connected to the decompression valves on the engine to vent the cylinders on the engine to atmosphere. Upon release of the button 290 on the valve device 42, the valve 281 will reseat and the valve 284 unseat to again vent the control chamber in the relay valve device 41 to atmosphere. The relay valve device 41 will then respond to terminate supply of fluid under pressure to the pipe 279 and the decompression valves on the engine will close. To prevent opening of the decompression valves on the engine when same is in operation, the chamber 103 in the relay valve device 41 is arranged to be charged with fluid under pressure by way of the pipe 273 and the double check valve device 35 from either the ahead or astern control pipes 242 or 243. Only when the lever 320 is in its "Stop" position will the chamber 103 in the relay valve device 41 be vented with both the ahead and astern control pipes 242 and 243, so that event though device 42 be operated to supply fluid under pressure to the control chamber in the relay valve device 41, same will respond to supply fluid under pressure to operate the decompression valves on the engine only in "Stop" position of lever 320.

In addition, since the control apparatus for controlling operation of the engine from a station remote from the engine, such as the pilot house on a ship by operation of the device 22, was somewhat modified to allow for control of operation of the engine by means of such as the controller device 16 at the engine, a brief description of control with the device 16 is in order.

When it is desired to control operation of the engine through use of the controller device 16 at the engine, in order to prevent interference with such control by the remote control apparatus, the handle 300 of the selector valve device 43 will be moved from its "Pilot house" position in which it is shown in the drawing to its "Engine room" position, thereby causing the supply pipe 252 to be cut off from the reservoir 152 and at the same time to be vented to atmosphere via port 296. When pipe 252 is thus vented to atmosphere, the operator's control device 22 in the pilot house is rendered ineffective, so that regardless of what position lever 320 may be in at the time, the ahead, astern, start and speed control pipes 242, 243, 245 and 319, respectively, will all vent to atmosphere; the push button type of valve device 42 for effecting decompression of the engine will be rendered ineffective to supply fluid under pressure to the decompression relay valve device 41; the piston 301 in the stop rod breaking cylinder device 44 will move to its position opposite to that in which it is shown in the drawing to cause alignment of the stop rod linkage 17' to allow for mechanical control of fuel cut off as well as fluid pressure control, as will be seen; with both the ahead and astern control pipes 242 and 243 vented, the control chamber 102 in the stop interlock device 34 will be so vented, so that venting of pipe 252 will vent pipe 370 via communication 118 in said device, so that fluid under pressure in chamber 87 in the fuel cut-off cylinder device 14 will vent to atmosphere via pipe 276, double check valve device 39, pipe 275, double check valve device 37, and said pipe 270, while at the same time pipe 247 will vent by way of double check valve device 38 and pipe 275; with pipe 247 vented, the start interlock device 31 will maintain its communication 118 established, connecting the pipe 240 to atmosphere by way of the pipe 246; the device 33 will be rendered ineffective, and the pipe 254 will remain vented to atmosphere regardless of movement of cam 265 with the fuel control lever 4; with pipe 240 vented the directional interlock will be rendered ineffective and regardless of whichever position it may be in will maintain the pipe 244 connected to either one of the vented ahead and astern control pipes 242 and 243; with pipe 240 vented the ventilating relay valve device 132 will maintain its communication 118 established connecting the pipe 96 to atmosphere by way of the pipe 311; also with pipe 240 vented, the start relay valve device 27 will maintain its communication 118 established, connecting the pipe 216 to atmosphere via the pipe 215; and since the ahead and astern control pipes 242 and 243 will remain vented, the pipes 192 and 195, hence also pipe 210, will remain vented via the cam shift interlock devices 20 and 21, regardless of their position; with pipe 192 vented, the relay valve device 18 will maintain its communication 118 established connecting the pipe 163 from the device 16 to the pipe 162 to the cam shift cylinder device 10; with pipe 195 vented, the astern relay valve device 19 will maintain its communication 118 established connecting the pipe 167 from the device 16 to the pipe 166 to the cam shift cylinder device 10; and with the pipe 210 vented, the brake relay valve device 26 will maintain its communication 118 established, connecting the pipe 212 to the plugged pipe 211.

Thus it will be seen, that while the supply pipe 252 is vented to atmosphere to allow for control of operation of the engine through use of the controller device 16, the pipes 270, 275, 254, 247, 240, 244, 96, 216, 192, 195 and 210 will remain vented to atmosphere. At the same time, communication is maintained between the controller device 16 and the cam shift cylinder device 10 for effecting shifting of cam shift gear 2 by way of the pipes 162, 163, 166, 167 and the respective communications 118 in the ahead and astern relay valve devices 18 and 19 in the remote control portion of the apparatus; communication between the pipe 130 and the device 16 is maintained for controlling operation of the starting air valve mechanism on the engine; communication is maintained between the pipe 212 and the controller device 16 for controlling operation of the brake 13, of the cam shift unlocking cylinder device 227 by way of double check valve device 40, and of the fuel cut-off cylinder device 14 by way of the double check valve device 39 and the pipe 276; and communication is maintained between the high pressure supply pipe 153 and said device 16 to assure a source of fluid under pressure for effecting selective pressurization of the above named pipes.

As for the selective establishment and disestablishment of pressure of fluid in the system as effected by the device 16 through movement of the cam shaft 17 to different angular positions, reference may be made to the schematic diagram of operation of the device 16 shown in Fig. 6. It is felt that by means of such a diagram control of operation of the engine by means of the device 16, which is old, will be self-explanatory and largely for this reason detailed description of such control is not included herein.

*Summary*

It will now be seen that I have provided novel and improved remote control apparatus particularly adapted for use in conjunction with a previously existent controller device at the engine to control operation of said engine. Such improved remote control apparatus comprising means whereby the supply of starting air to the engine is cut off automatically, means whereby either a normal or rapid stopping of the engine may be effected without the use of starting air, means whereby parts of the remote control apparatus cooperate with the previously existent controller device for controlling operation of the engine; and means whereby certain parts of the remote control apparatus may be conditioned so as not to interfere with control of engine operation by said controller device.

While in the above description the terms "Ahead" and "Astern" have been used it is desired to point out that these terms are to be considered synonymous with forward and reverse.

Having now described our invention, what we claim as new and desire to secure by Letters Patent, is:

1. Apparatus for controlling the reversing of a reversible internal combustion engine, comprising reversing means operable to effect conditioning of said engine for operation in its reverse direction, fuel cut-off means operable to effect cut off of supply of fuel to said engine, starting means operable to effect starting of said engine, brake means operable to stop said engine, an operator's control device operable to a reverse start position to effect operation of said reversing means, said fuel cut-off means and said brake means, means operable upon stopping of the engine to terminate operation of said brake means and to effect operation of said starting means, and means operable upon starting of said engine in its reverse direction to terminate operation of said fuel cut-off means.

2. Apparatus for controlling the reversing of a reversible internal combustion engine, comprising reversing means operable to effect conditioning of said engine for operation in its reverse direction, fuel cut-off means operable to effect cut off of supply of fuel to said engine, starting means operable to effect starting of said engine, brake means operable to stop said engine, an operator's control device operable to a reverse start position to effect operation of said reversing means, said fuel cut-off means and said brake means, means operable upon stopping of the engine to terminate operation of said brake means and to effect operation of said starting means, means operable upon starting of said engine in its reverse direction to terminate operation of said fuel cut-off means, and means operable upon running of said engine on fuel to terminate operation of said starting means.

3. Apparatus for controlling the reversing of a reversible internal combustion engine, comprising reversing means operable to effect conditioning of said engine for operation in its reverse direction, fuel cut-off means operable to effect cut off of supply of fuel to said engine, starting means operable to effect starting of said engine, brake means operable to stop said engine, an operator's control device operable to a reverse start position to effect operation of said reversing means, said fuel cut-off means and said brake means, speed sensitive means operable upon stopping of the engine to terminate operation of said brake means and to effect operation of said starting means, interlock means to render said speed sensitive means ineffective until the engine is conditioned for operation in its reverse direction, and means operable upon running of said engine in its reverse direction to terminate operation of said fuel cut-off means.

4. Apparatus for controlling the reversing of a reversible internal combustion engine, comprising reversing means operable to effect conditioning of said engine for operation in its reverse direction, fuel cut-off means operable to effect cut off of supply of fuel to said engine, starting means operable to effect starting of said engine, brake means operable to stop said engine, an operator's control device operable to a reverse start position to effect operation of said reversing means, said fuel cut-off means and said brake means, speed sensitive means operable upon stopping of the engine to terminate operation of said brake means and to effect operation of said starting means, interlock means to render said speed sensitive means ineffective until the engine is conditioned for operation in its reverse direction, means operable upon running of said engine in its reverse direction to terminate operation of said fuel cut-off means, and means operable upon running of said engine on fuel to terminate operation of said starting means.

5. Apparatus for controlling the reversing, running and stopping of a reversible internal combustion engine, comprising reversing means operable to effect conditioning of said engine for operation in its reverse direction, fuel cut-off means operable to effect cut off of supply of fuel to said engine, starting means operable to effect starting of said engine, brake means operable to stop said engine, an operator's control device operable to a reverse start position to effect operation of said reversing means, said fuel cut-off means and said brake means, means operable upon stopping of the engine when said control device is in its reverse start position to terminate operation of said brake means and to effect operation of said starting means, means operable upon starting of said engine in its reverse direction to terminate operation of said fuel cut-off means, means operable upon running of said engine on fuel to terminate operation of said starting means, and means responsive to movement of said operator's control device to a neutral position to effect operation of said fuel cut-off means.

6. Apparatus for controlling the reversing, running, and stopping of a reversible internal combustion engine adapted to run on fuel, comprising reversing means movable to an ahead position to effect conditioning of said engine for operation in one direction and to an astern position to effect conditioning of said engine for operation in an opposite direction, fuel cut-off means operable to effect cut off of fuel supply to said engine, starting means operable to effect starting of said engine, brake means operable to stop said engine, an operator's control device operable to a neutral, ahead, ahead start, astern, and astern start positions, means operable in response to operation of said control device to either its ahead position or to its ahead start position to move said reversing means to its ahead position and operable in response to operation of said control device to either its astern position or to its astern start position to move said reversing means to its astern position, means operable to effect operation of said brake means and said fuel cut-off means only when position of said reversing means is not in accord with position of said control device, engine speed sensitive means operable upon stopping of the engine to terminate operation of said brake means, start interlock means operable upon termination of operation of said brake means by said speed responsive means to effect operation of said starting means when said control device is in either its ahead start position or its astern start position, means operable upon starting of said engine in a direction in accord with position of said reversing means to effect termination of operation of said fuel cut-off means, and means operable upon running of said engine on fuel to terminate operation of said starting means.

7. Apparatus for controlling the reversing, running, and stopping of a reversible internal combustion engine adapted to run on fuel, comprising reversing means movable to an ahead position to effect conditioning of said engine for operation in one direction and to an astern position to effect conditioning of said engine for operation in an opposite direction, fuel cut-off means operable to effect cut off of fuel supply to said engine, starting means operable to effect starting of said engine, brake means operable to stop said engine, an operator's control device operable to a neutral, ahead, ahead start, astern, and astern start positions, means operable in response to operation of said control device to either its ahead position or to its ahead start position to move said reversing means to its ahead position and operable in response to operation of said control device to either its astern position or to its astern start position to move said reversing means to its astern position, means operable to effect operation of said brake means and said fuel cut-off means only when position of said reversing means is not in accord with position of said control device, engine speed sensitive means operable upon stopping of the engine to terminate operation of said brake means, start interlock means operable upon termination of operation of said brake means by said speed responsive means to effect operation of said starting means when said control device is in either its ahead start position or its astern start position, means operable upon starting of said engine in a direction in accord with position of said reversing means to effect termination of operation of said fuel cut-off means, means operable upon running of said engine on fuel to terminate operation of said starting means, stop interlock means operable upon movement of said control device to its stop position to effect operation of said fuel cut-off means.

8. Apparatus for controlling the starting of an internal combustion engine, comprising starting means operable to rotate said engine for starting, fuel control means movable to and between a maximum fuel supply position and a minimum fuel supply position for regulating supply of fuel to said engine accordingly during running, starting fuel limit means operable to prevent said fuel control means from attaining its maximum fuel supply position during starting of said engine bias means urging said fuel control means toward its maximum fuel supply position, control means operable to effect operation of said starting means and said fuel limit means, and means operatively connected to said control means to effect termination of operation of said starting means and of said fuel limit means upon running of said engine on fuel.

9. Apparatus for controlling starting of an air started reversible engine comprising in combination, reversing means for said engine, operator's control means for effecting operation of said reversing means to reverse said engine and for effecting supply of starting air to said engine, starting interlock means adapted to cooperate with said operator's control means for controlling supply of starting air to said engine, engine lubricating oil pressure responsive means, and means controlled by said reversing means cooperative with said pressure responsive means to condition said starting interlock means to prevent supply of starting air to said engine except upon substantial dissipation of said oil pressure.

10. Apparatus for controlling supply of starting air and of fuel to a reversible engine comprising in combination, reversing means for said engine, operator's control means for effecting operation of said reversing means to reverse said engine and for also effecting supply of starting air to said engine, fuel cut-off means, starting interlock means for controlling supply of starting air to said engine, directional interlock means adapted to respond to direction of operation of said engine for effecting operation of said fuel cut-off means and for conditioning said starting interlock means to cooperate with said operator's control device in response to said operation of said operator's control device and for rendering said fuel cut-off means ineffective upon turning of said engine in a direction corresponding to the condition of said reversing means, engine lubricating oil pressure responsive means, and means controlled by said reversing means cooperative with said oil pressure responsive means to condition said starting interlock means to prevent supply of starting air to said engine except upon substantial dissipation of said oil pressure.

11. An engine control apparatus comprising a fuel control shaft, a manual controller device having a stop position, means including link means operable by said control device in said stop position to move said fuel control shaft to a fuel-off position, a motor operable by fluid under pressure to render said link means ineffective to actuate said shaft and upon release of fluid under pressure effective to actuate said shaft, a source of fluid under pressure, another motor operable by fluid under pressure to move said shaft out of said fuel off position according to the pressure of such fluid, another operator's control device for controlling supply of fluid under pressure from said source to said other motor and release of fluid under pressure therefrom, and a selector valve controlling supply of fluid under pressure from said source to both of said motors and operable to either provide such supply simultaneously or to cut off such supply and release fluid under pressure from the first named motor.

12. Apparatus for controlling starting of an engine comprising starting means for said engine, fuel control means for said engine, starting fuel limiting means for adjusting said fuel control means to a position intermediate maximum and minimum fuel supply positions during starting of said engine, interlock means for effecting simultaneous operation of said starting means and said starting fuel limiting means, and means responsive to running of said engine on fuel to terminate operation of said starting means and to render said starting fuel limiting means ineffective.

13. A reversible engine control apparatus comprising in combination, a forward pipe, a reverse pipe, an engine start pipe, an operator's control device for selectively supplying fluid under pressure to either one of said forward and reverse pipes while venting the other and for at the same time effecting supply of fluid under pressure to said start pipe and also operative to vent all of said pipes at the same time, engine reversing means responsive to fluid under pressure supplied to either one or the other of said forward and reverse pipes to condition said engine for operation in a corresponding direction, starting means arranged for operation by fluid under pressure from said start pipe to effect starting of said engine, fuel control means for said engine, fuel limit means arranged for operation by fluid under pressure from said start pipe to adjust said fuel control means to a fuel supply position between maximum and minimum limits, fuel cut-off means for adjusting said fuel control means to a fuel cut-off position, starting interlock means controlling communication through said start pipe operable upon supply of fluid under pressure to a first pipe to close said communication and upon release of fluid under pressure from said first pipe and supply of fluid under pressure to a second pipe to open said communication, fluid pressure operable braking means for said engine, means controlled by said reversing means for effecting supply of fluid under pressure to said braking means, to said first pipe and to said fuel cut-off means during operation of said reversing means and to terminate such supply upon termination of operation of said reversing means, speed responsive means operable upon stopping of said engine to release fluid under pressure from said first pipe and from said braking means, directional interlock means responsive to direction of operation of said engine operable upon operation of said operator's control device to supply fluid under pressure to either said forward or said reverse pipe to supply fluid under pressure to said second pipe and to said fuel cut-off means and responsive to operation of said engine in a direction corresponding to the position of said reversing means to vent fluid under pressure from said cut-off means, means controlled by the position of said fuel control means for supplying fluid under pressure to said second pipe with said fuel control means adjusted to supply fuel to said engine in excess of a chosen degree and for venting said second pipe upon adjustment of said fuel control means to a position for supplying a lesser amount of fuel to said engine, and a speed governor responsive to speed of operation of said engine for controlling adjustment of said fuel control means.

14. An engine control apparatus comprising in combination, a source of fluid under pressure, fluid pressure engine braking means applied by supply of a quantity of fluid under pressure thereto and released by release of such quantity of fluid under pressure therefrom, brake application means operable to effect supply of said quantity to said braking means, brake release means to release said quantity of fluid under pressure from said braking means, and engine lubricating oil pressure controlled means for effecting operation of said release means, upon stopping of said engine.

15. Engine control apparatus comprising in combination with an engine fuel control shaft actuable to a fuel-off position, of a source of fluid under pressure, first motor means responsive to supply of fluid under pressure to a first chamber to apply an effort urging said fuel control shaft to assume its fuel-off position and responsive to release of fluid under pressure from said chamber to terminate such effort, a fluid pressure supply conduit, a control valve device for location at a station remote from said control shaft operable to selectively effect connection of said chamber to either said supply pipe or to atmosphere, a breakable link actuable to an aligned position to move said fuel control shaft to its fuel-off position and actuable to a broken position to allow said fuel control shaft freedom of movement, second motor means responsive to supply of fluid under pressure to a second chamber to actuate said link to its broken position and responsive to release of fluid under pressure from said second chamber to actuate said link to its aligned position, and other valve means to selectively establish connection of said supply conduit and said second chamber to either said source or to atmosphere.

ROY R. STEVENS.
RALPH C. BROOKS.

REFERENCES CITED

The following references are of record in the file of this patent:

UNITED STATES PATENTS

| Number | Name | Date |
|---|---|---|
| 1,654,220 | Johnstone | Dec. 27, 1927 |
| 1,991,202 | Flamini | Feb. 12, 1935 |
| 2,021,502 | Fergueson | Nov. 19, 1935 |
| 2,245,883 | Ramstad | June 3, 1941 |
| 2,395,202 | Stevens | Feb. 19, 1946 |
| 2,482,301 | Stevens | Sept. 20, 1949 |
| 2,485,033 | Budzien | Oct. 18, 1949 |